(12) United States Patent
Nitobe et al.

(10) Patent No.: US 10,551,950 B2
(45) Date of Patent: Feb. 4, 2020

(54) DISPLAY DEVICE HAVING TOUCH PANEL AND METHOD OF DRIVING DISPLAY DEVICE HAVING THE SAME

(71) Applicant: Japan Display Inc., Tokyo (JP)

(72) Inventors: Ryutaro Nitobe, Tokyo (JP); Yoshihiro Kotani, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/658,815

(22) Filed: Jul. 25, 2017

(65) Prior Publication Data

US 2018/0024678 A1 Jan. 25, 2018

(30) Foreign Application Priority Data

Jul. 25, 2016 (JP) ................. 2016-145603

(51) Int. Cl.
| | |
|---|---|
| *G06F 3/041* | (2006.01) |
| *G02F 1/1362* | (2006.01) |
| *G02F 1/1333* | (2006.01) |
| *G02F 1/1343* | (2006.01) |
| *G09G 3/36* | (2006.01) |
| *G06F 3/044* | (2006.01) |

(52) U.S. Cl.
CPC ........ *G06F 3/0412* (2013.01); *G02F 1/13338* (2013.01); *G02F 1/134336* (2013.01); *G02F 1/136286* (2013.01); *G06F 3/044* (2013.01); *G09G 3/3677* (2013.01); *G02F 2001/134345* (2013.01); *G02F 2001/134372* (2013.01); *G02F 2201/121* (2013.01); *G06F 2203/04108* (2013.01); *G09G 3/3614* (2013.01); *G09G 2310/0291* (2013.01); *G09G 2310/08* (2013.01)

(58) Field of Classification Search
CPC ....... G06F 3/412; G06F 3/044; G09G 3/3677; G09G 3/3614; G02F 1/13338; G02F 1/134336; G02F 1/136286
See application file for complete search history.

(56) References Cited

U.S. PATENT DOCUMENTS

| | | | |
|---|---|---|---|
| 2014/0152616 A1 | 6/2014 | Kida et al. | |
| 2017/0004798 A1* | 1/2017 | Park ................. | G09G 3/3648 |
| 2017/0045964 A1* | 2/2017 | Huang .............. | G06F 3/0412 |
| 2017/0090624 A1* | 3/2017 | Kwon ............... | G06F 3/0416 |
| 2017/0285804 A1* | 10/2017 | Li .................... | G06F 3/044 |

FOREIGN PATENT DOCUMENTS

| | | |
|---|---|---|
| CN | 103698927 | 4/2014 |
| JP | 2015-164033 | 9/2015 |
| JP | 2016-014857 | 1/2016 |
| JP | 2014-132446 A | 7/2017 |

OTHER PUBLICATIONS

Japanese Office Action dated Aug. 20, 2019 in corresponding Japanese Application No. 2016-145603.

* cited by examiner

*Primary Examiner* — Kwang-Su Yang
(74) *Attorney, Agent, or Firm* — K&L Gates LLP

(57) ABSTRACT

According to one embodiment, a display device comprises a common electrode driver configured to supply to common electrodes a display voltage during a display period and a touch detection drive signal during a touch detection period, a source amplifier configured to supply an image signal to source lines, a gate driver configured to supply to gate lines a scanning signal during a display period and a guard signal during a touch detection period, and switches configured to connect the source lines and the common electrodes during a touch detection period.

11 Claims, 28 Drawing Sheets

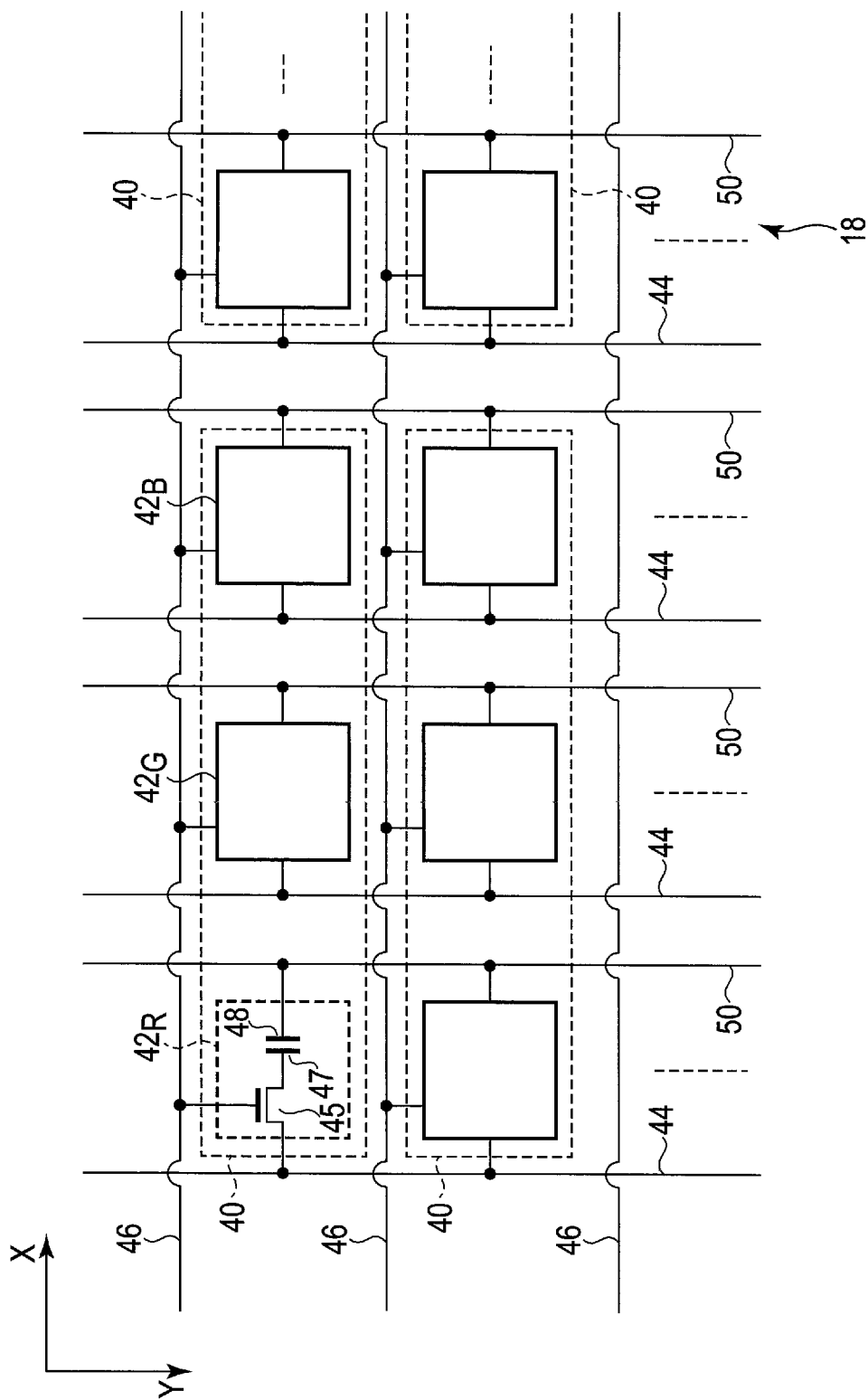
F I G. 2

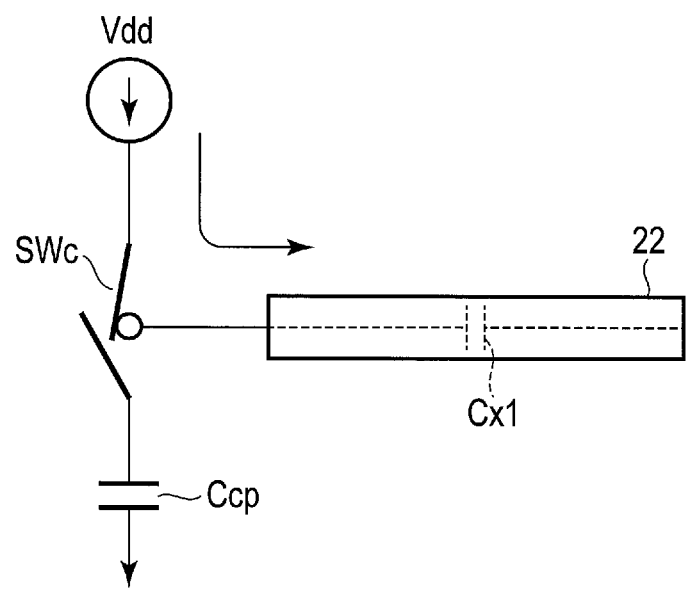
F I G. 6A
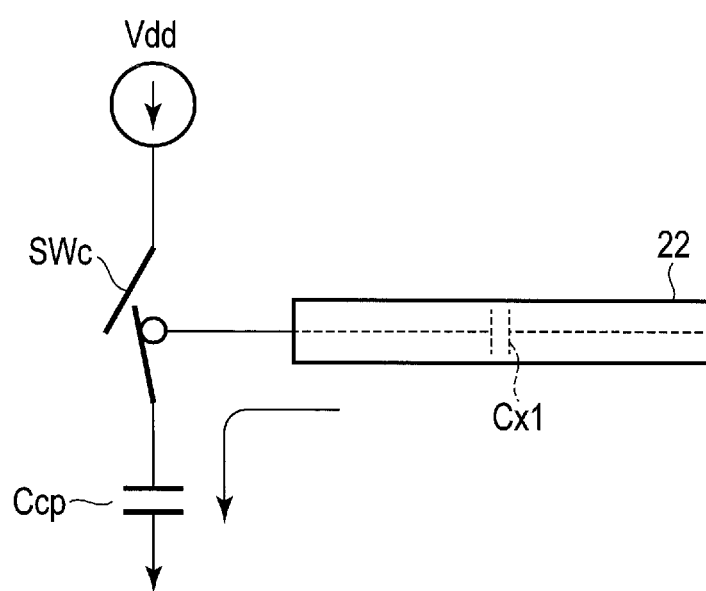
F I G. 6B

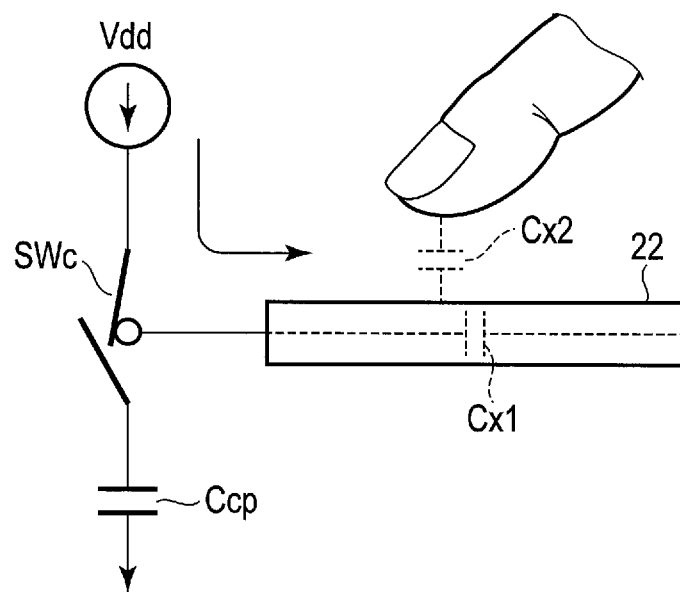
F I G. 7A
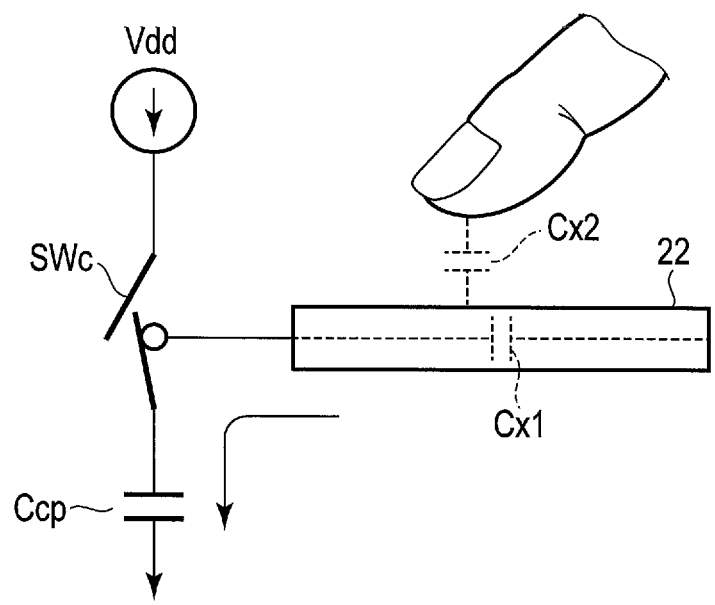
F I G. 7B

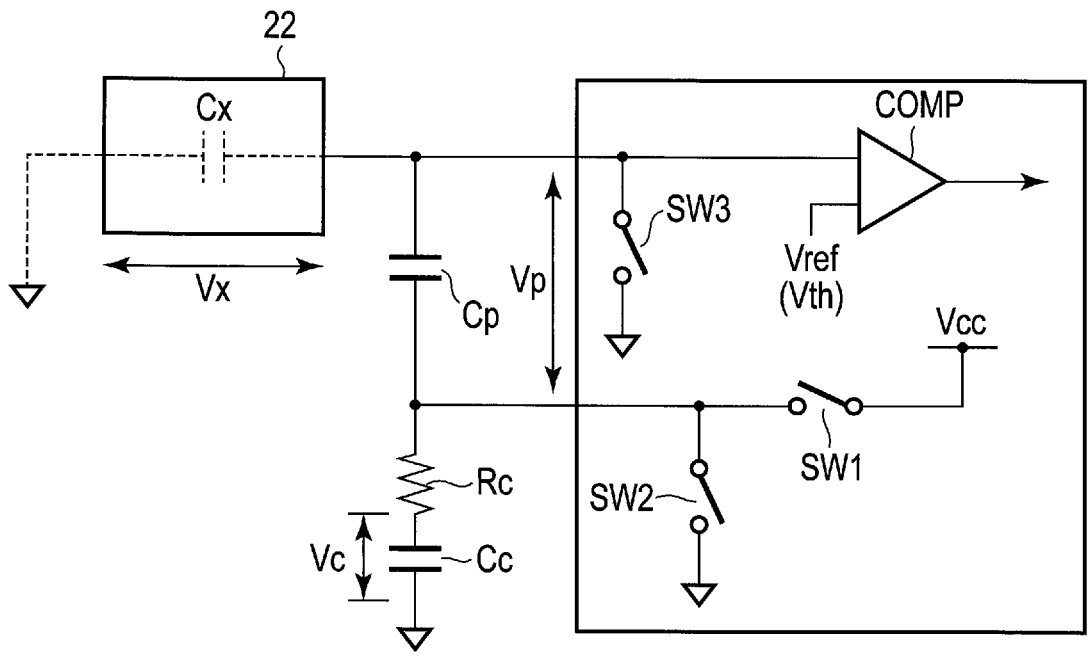
F I G. 8A
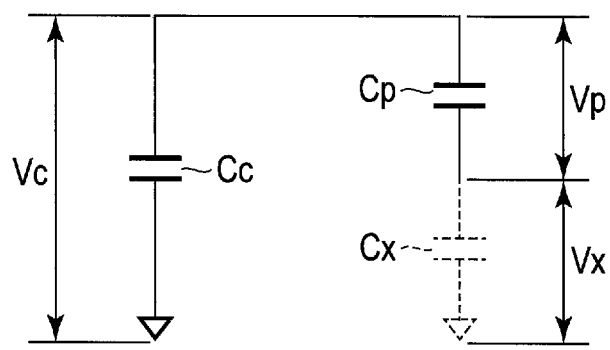
F I G. 8B

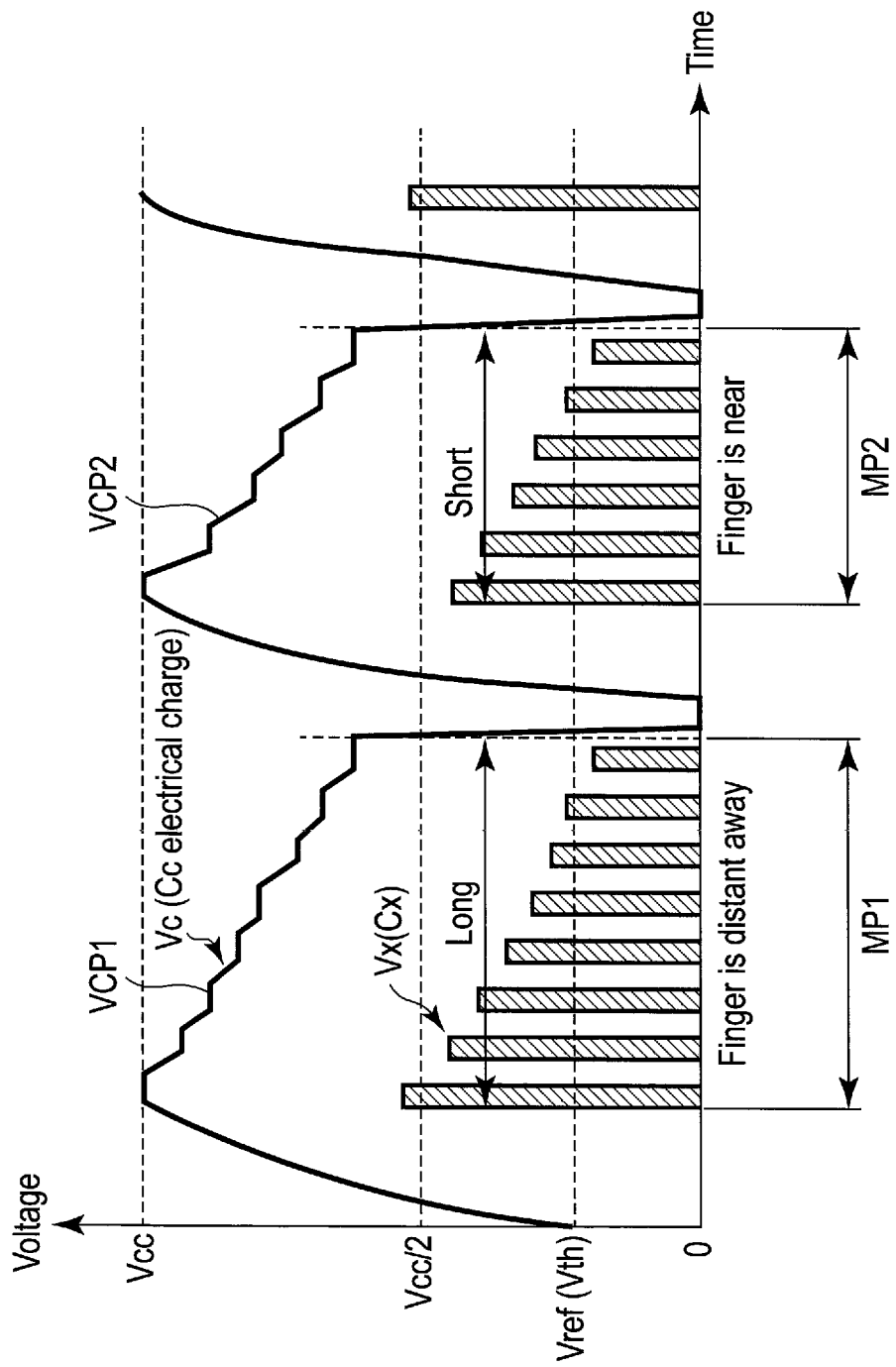
F I G. 9

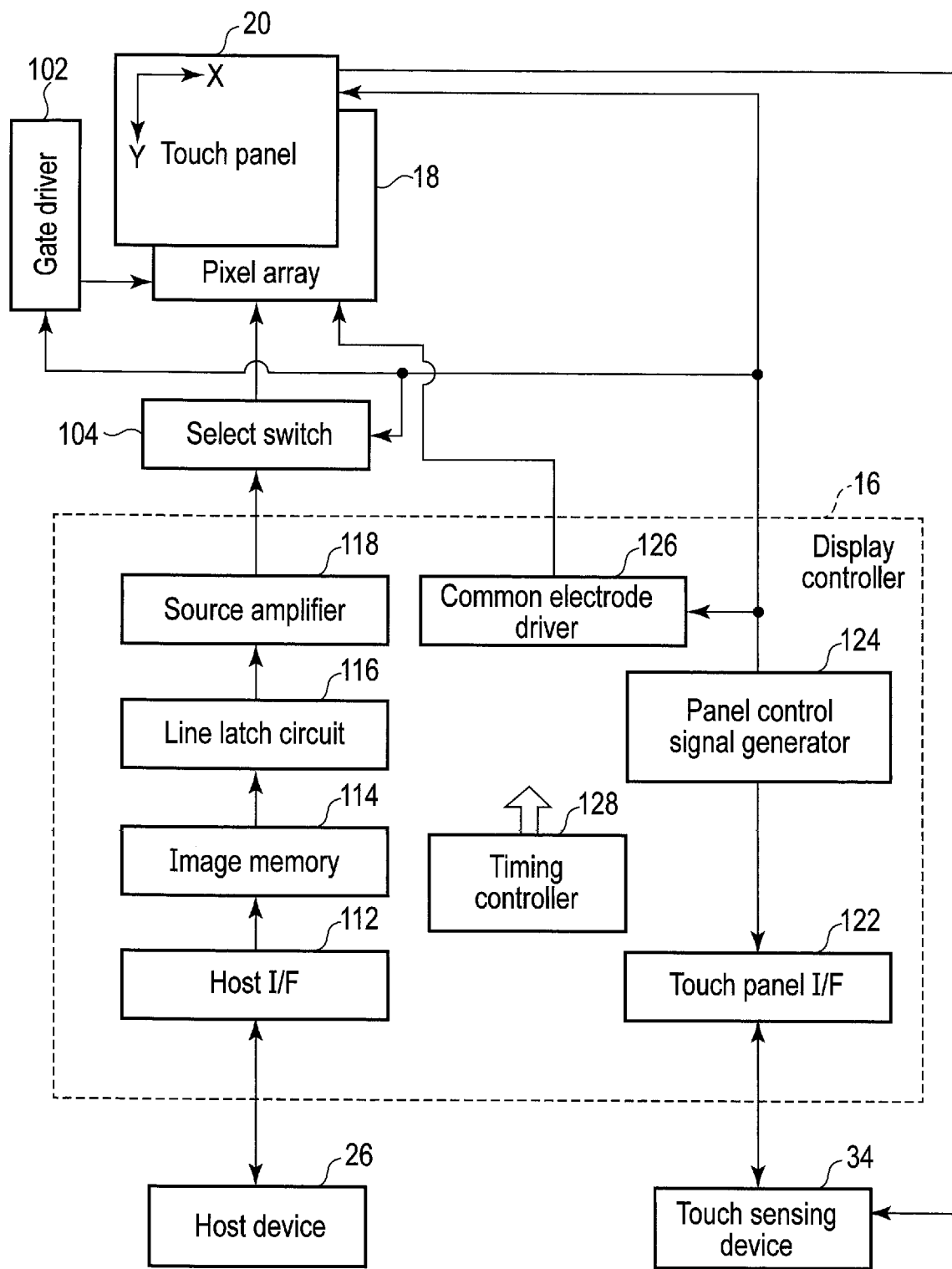
F I G. 11

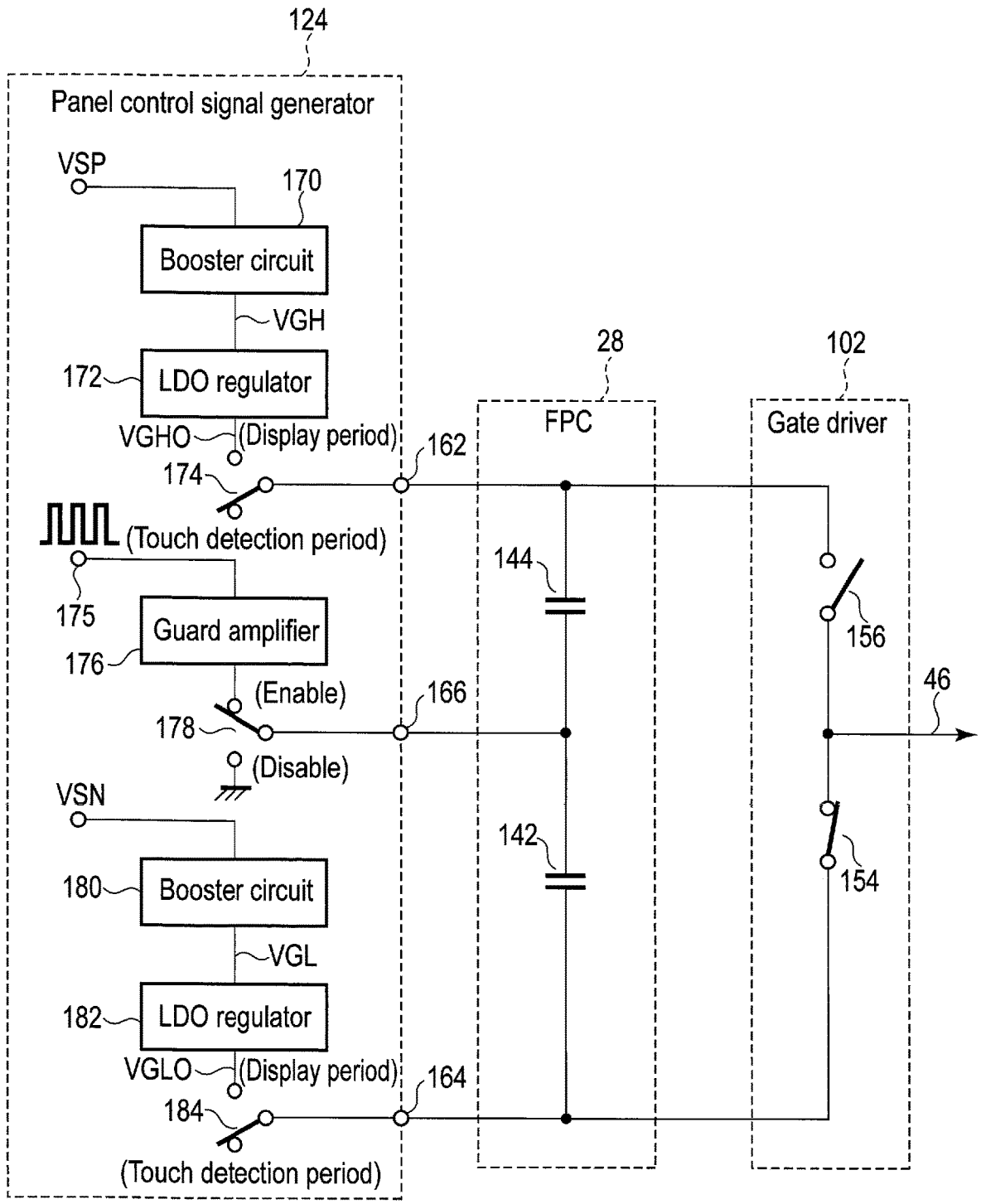
F I G. 13

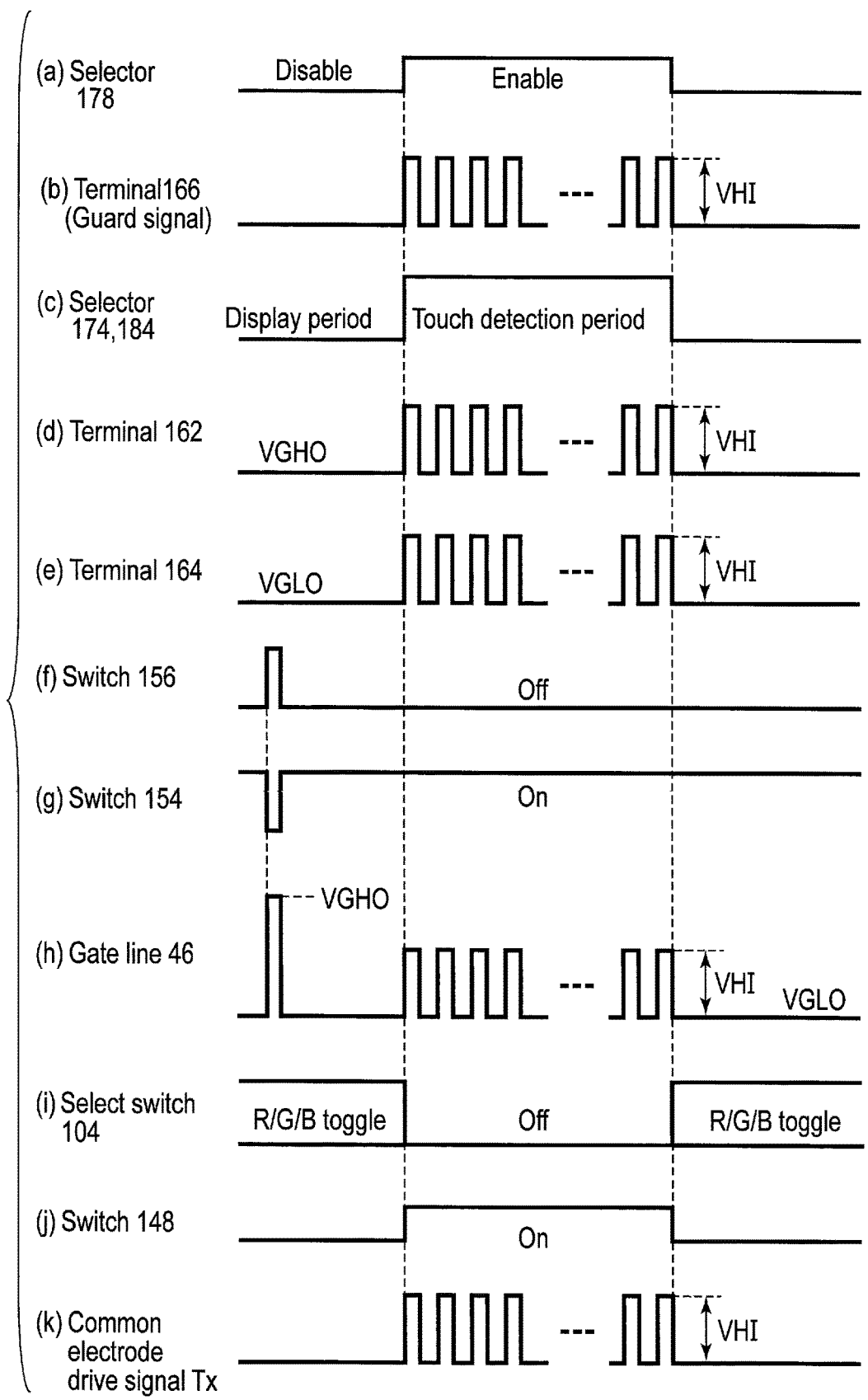
F I G. 14

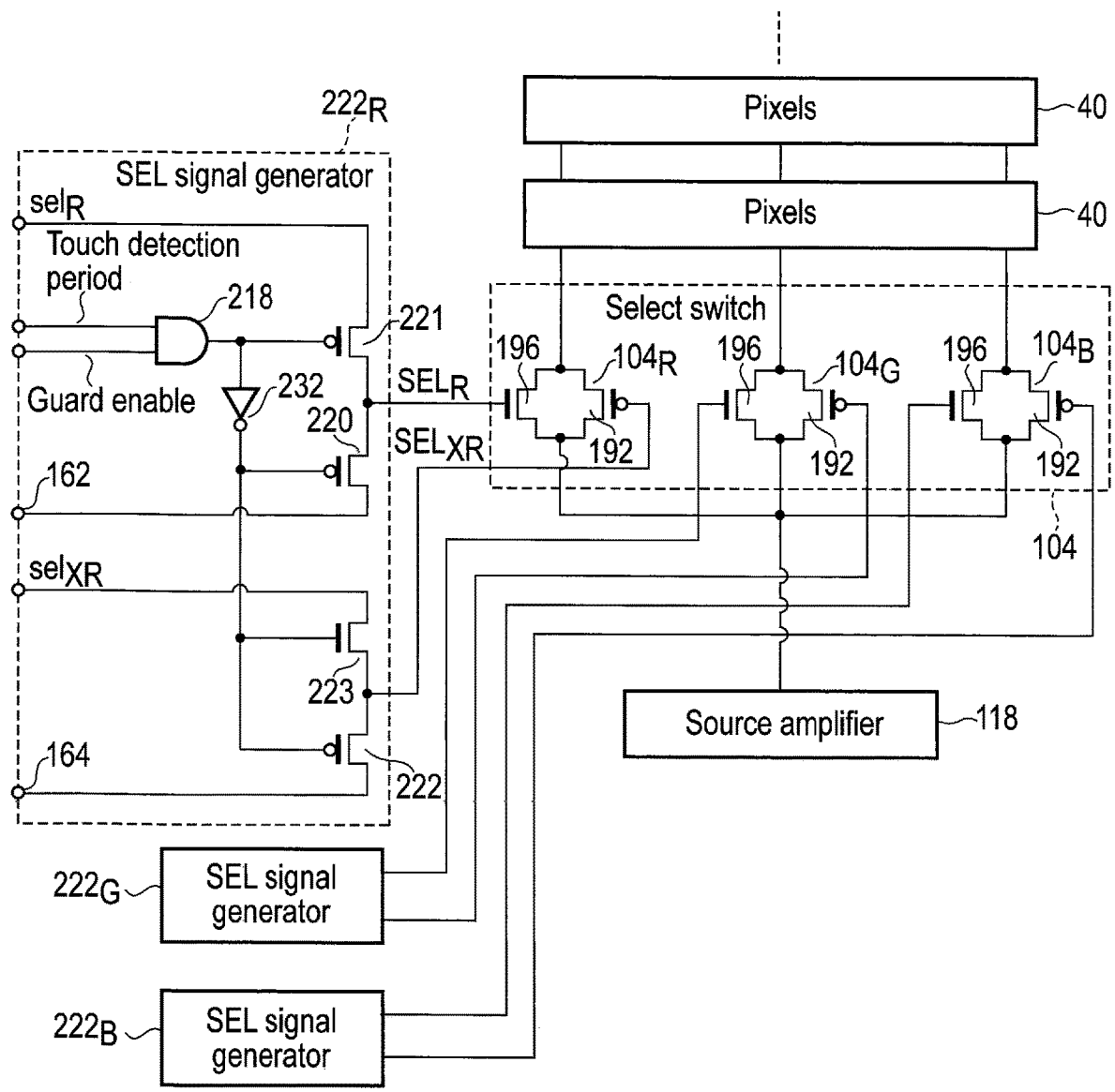
F I G. 19

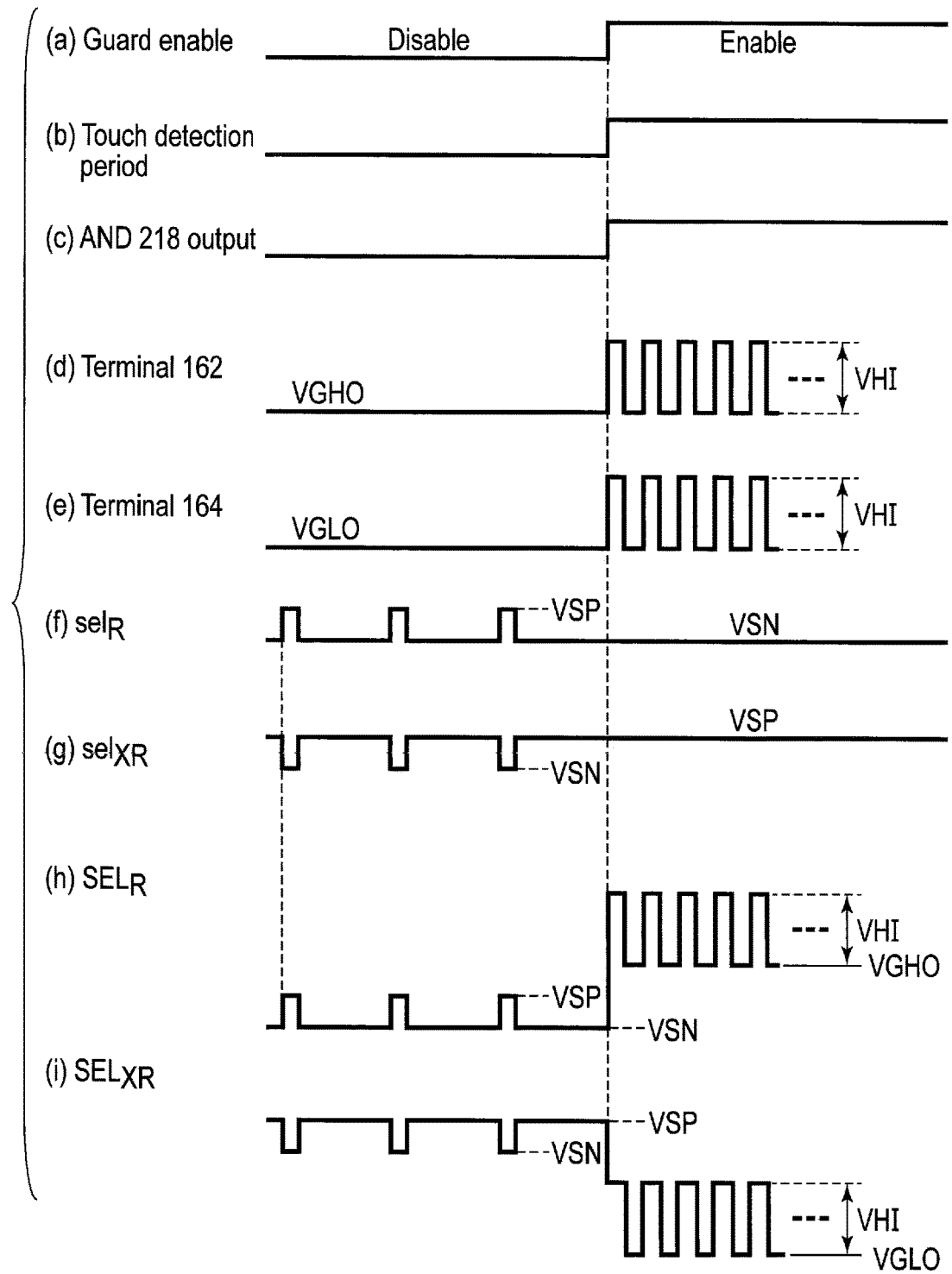
F I G. 20

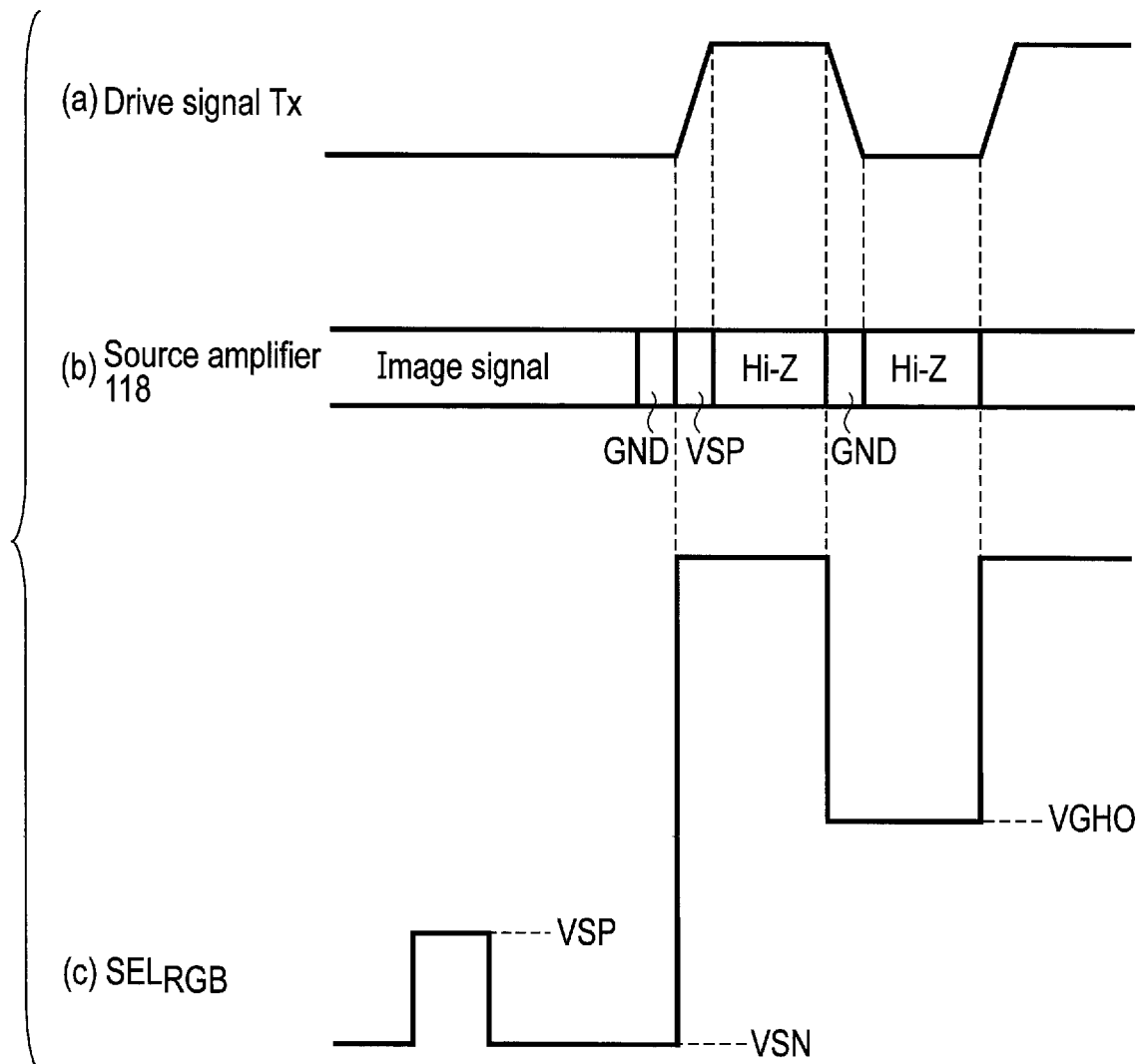
F I G. 25

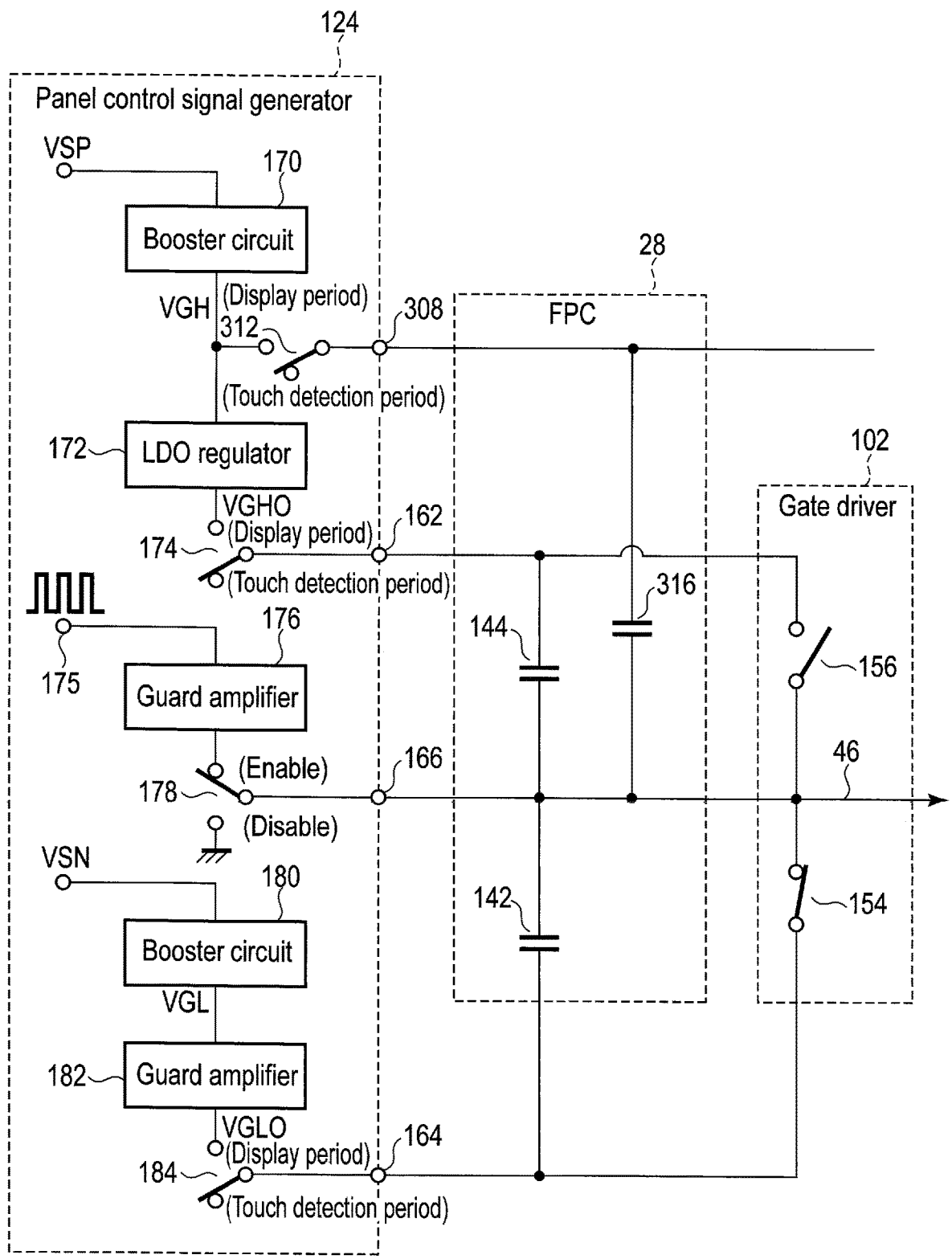
F I G. 27

DISPLAY DEVICE HAVING TOUCH PANEL AND METHOD OF DRIVING DISPLAY DEVICE HAVING THE SAME

CROSS-REFERENCE TO RELATED APPLICATIONS

This application is based upon and claims the benefit of priority from Japanese Patent Application No. 2016-145603, filed Jul. 25, 2016, the entire contents of which are incorporated herein by reference.

FIELD

Embodiments described herein relate generally to a display device with a touch detecting function, and a method of driving the display device.

BACKGROUND

In recent years, a portable electronic device such as a smart phone or a tablet has a display device with a touch sensor. The touch sensor detects contact or close proximity of a conductive material (hereafter "contact" and "close proximity" is generically called "touch"). The conductive material includes a finger, a stylus, and so forth. Such an electronic device displays on a screen a menu image including many icons, for example, and determines which icon is touched in order to recognize which action the electronic device should take. Consequently, a user can operate an electronic device, without using such an input device as a keyboard, a mouse, or a keypad.

A touch sensing system includes an optical type system, a resistance type system, a capacitance type system, and others. Among them, the capacitance type system is widely used since it is comparatively simple in structure and little in energy consumption. A touch sensor employing a capacitance type system detects a touch using a fact that an electrode will change in its capacitance when an electric conductor approaches the electrode (i.e., an electrode will increase in capacitance when an electric conductor approaches the electrode).

It is possible to attach a touch panel with such a touch sensor on a screen of a display device. In recent years, however, a touch panel is built into a display device in many cases. With the progress of making thinner a display device with a touch panel, electrodes of a touch sensor is closer to various wirings for driving the display device to display an image or the wirings is much closer to one another. As a result, parasitic capacitance may be connected among them. If parasitic capacitance is connected between a driving electrode and a wiring in a capacitance type touch sensor, a drive signal will deteriorate in waveform and is delayed in transmission, whereby touch detection deteriorates in accuracy or detection time is long. In this way, a capacitance type touch sensor is easily affected by parasitic capacitance.

SUMMARY

The present disclosure relates generally to a display device and a method of driving a display device.

In an embodiment, a display device is provided. The display device includes a pixel array comprising pixels two dimensionally arranged in rows and columns; common electrodes over the pixel array for capacitance type touch detection; a common electrode driver configured to supply a voltage for display to the common electrodes during a display period and a drive signal for touch detection to the common electrodes during a touch detection period; source lines connected to the columns of the pixels in the pixel array; a source amplifier configured to supply an image signal to the source lines; gate lines connected to the rows of the pixels in the pixel array; a gate driver configured to successively supply a scanning signal to the gate lines during a display period, and supply a signal in the same phase as the drive signal to the gate lines during a touch detection period; and first switches connected between the source lines and the common electrodes and configured to connect the source lines and the common electrodes during a touch detection period.

In another embodiment, a method of driving a display device is provided. The method includes a pixel array comprising pixels two dimensionally arranged in rows and columns; common electrodes over the pixel array for capacitance type touch detection; a common electrode driver connected to the common electrodes; source lines connected to the columns of the pixels in the pixel array; a source amplifier connected to the source lines; gate lines connected to the rows of the pixels in the pixel array; a gate driver connected to the gate lines; and switches connected between the source lines and the common electrodes, the method comprising: supplying, by the common electrode driver, a voltage for display to the common electrodes during a display period; supplying, by the common electrode driver, a drive signal for touch detection during a touch detection period; supplying, by the source amplifier, an image signal to the source lines; successively supplying, by the gate driver, a scanning signal to the respective gate lines during a display period; successively supplying, by the gate driver, a signal in the same phase as the drive signal to the gate lines during a touch detection period; and connecting, by the switch, the source lines and the common electrodes each other during a touch detection period.

Additional features and advantages are described herein, and will be apparent from the following Detailed Description and the figures.

BRIEF DESCRIPTION OF THE DRAWINGS

FIG. 2 is a circuit diagram illustrating an exemplary pixel array.

FIG. 6A is an exemplary view illustrating a principle of touch detection in a self sensing system.

FIG. 6B is an exemplary view illustrating a principle of touch detection in a self sensing system.

FIG. 7A is an exemplary view illustrating a principle of touch detection in a self sensing system.

FIG. 7B is an exemplary view illustrating a principle of touch detection in a self sensing system.

FIG. 8A is an exemplary view illustrating a touch detection circuit of a self sensing system.

FIG. 8B is an exemplary view illustrating a touch detection circuit of a self sensing system.

FIG. 9 is an exemplary graph illustrating a relation between capacitance Cx and voltage Vx and a relation between capacitance Cc and voltage Vc, illustrated in FIGS. 8A and 8B.

FIG. 11 is an exemplary block diagram schematically illustrating the display device.

FIG. 13 is an exemplary block diagram illustrating a portion in a panel control signal generator, the portion relating to a guard drive of the gate lines.

FIG. 14 shows an exemplary timing chart illustrating the guard drive of the gate lines.

FIG. 19 is an exemplary circuit diagram illustrating a select control signal generator for a select switch in the panel control signal generator according to a third embodiment.

FIG. 20 shows an exemplary timing chart illustrating a guard drive for a select signal line in the select switch according to the third embodiment.

FIG. 25 shows an exemplary timing chart illustrating the guard drive for the output of the source amplifier according to the sixth embodiment.

FIG. 27 is an exemplary block diagram illustrating a portion relating to the guard drive for a gate line in the panel control signal generator according to an eighth embodiment.

DETAILED DESCRIPTION

Figure 1:
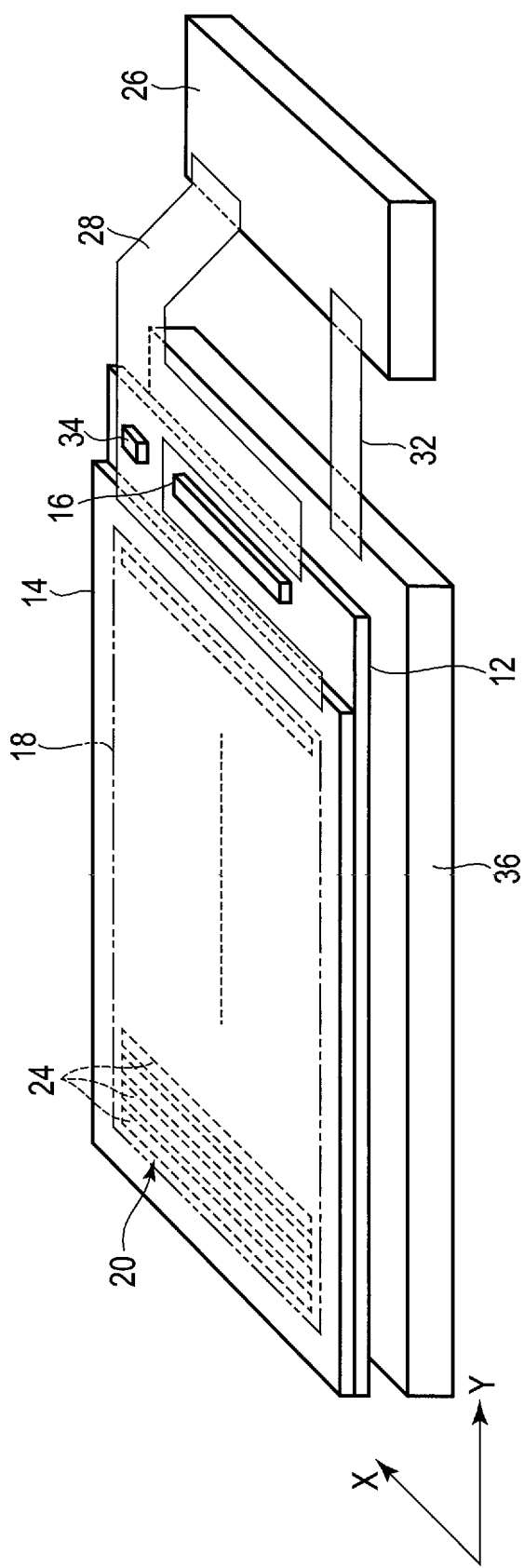
FIG. 1 is a perspective view schematically illustrating an exemplary structure of a display device with a touch detecting function according to an embodiment.

Embodiments will be described hereinafter with reference to the accompanying drawings.

In general, according to one embodiment, a display device comprises a pixel array comprising pixels two dimensionally arranged in rows and columns; common electrodes over the pixel array for capacitance type touch detection; a common electrode driver configured to supply a voltage for display to the common electrodes during a display period and a drive signal for touch detection to the common electrodes during a touch detection period; source lines connected to the columns of the pixels in the pixel array; a source amplifier configured to supply an image signal to the source lines; gate lines connected to the rows of the pixels in the pixel array; a gate driver configured to successively supply a scanning signal to the gate lines during a display period, and supply a signal in the same phase as the drive signal to the gate lines during a touch detection period; and first switches connected between the source lines and the common electrodes and configured to connect the source lines and the common electrodes during a touch detection period.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

First Embodiment

[General Structure]

FIG. 1 is a perspective view schematically illustrating an exemplary overall structure of a display device with a touch detecting function according to an embodiment. The display device includes a display panel with a touch detection mechanism, a drive circuit and a control circuit for the display panel. The display panel includes a display panel using a liquid crystal and a display panel using organic electroluminescence. In the following, a display panel using a liquid crystal will be explained, as an example. A liquid crystal display panel includes a pixel substrate in which thin film transistor (TFT) pixels are formed.

"Touch detection" means to detect that an object such as a finger or a stylus not only touches but also is brought in close proximity to a display panel. An "integral type" means that that a touch sensor is built in a display panel and does not mean that a touch sensor is externally attached to a display panel. "Built in" includes an "in cell" type and an "on cell" type. In an "in cell" type, touch sensor is provided on a pixel substrate. In an "on cell" type, a touch sensor is provided between a polarizing plate and a glass substrate having a color filter. An "in cell" type touch sensor will be explained as an embodiment. However, an "on cell" type is also applicable to the embodiment.

A display panel includes a first transparent substrate (hereinafter, called a first substrate) 12 of glass, resin, or the like; a second transparent substrate (hereinafter, called a second substrate) 14 of glass, resin, or the like and facing the first substrate 12. A liquid crystal layer (not illustrated) is between the first substrate 12 and the second substrate 14.

The first substrate 12 may be called a pixel substrate because pixels are formed in a matrix shape, as illustrated in FIG. 2. The second substrate 14 may be called a counter substrate. The display panel is observed from a side where the second substrate 14 is located. Therefore, the second substrate 14 may be called an upper substrate, and the first substrate 12 may be called a lower substrate.

The display panel is formed like a rectangular flat board having a shorter side extending along X axis and a longer side extending along Y axis. The size of the first substrate 12 and the size of the second substrate 14 are the same in the shorter side but different in the longer side. The first substrate 12 is longer than the second substrate 14 in the loner side. Therefore, if one of the shorter sides of the first substrate 12 and one of the shorter sides of the second substrate 14 are aligned, the other of the shorter sides of the first substrate 12 locates outside of the second substrate 14. A display controller 16 for driving the display panel to display an image is mounted on an extension of the first substrate 12 that projects from the second substrate 14 along Y axis. It is possible to make the display controller 16 as an integrated circuit. If the display controller 16 is made as an integrated circuit, it may be called a display controller IC.

Figure 4:
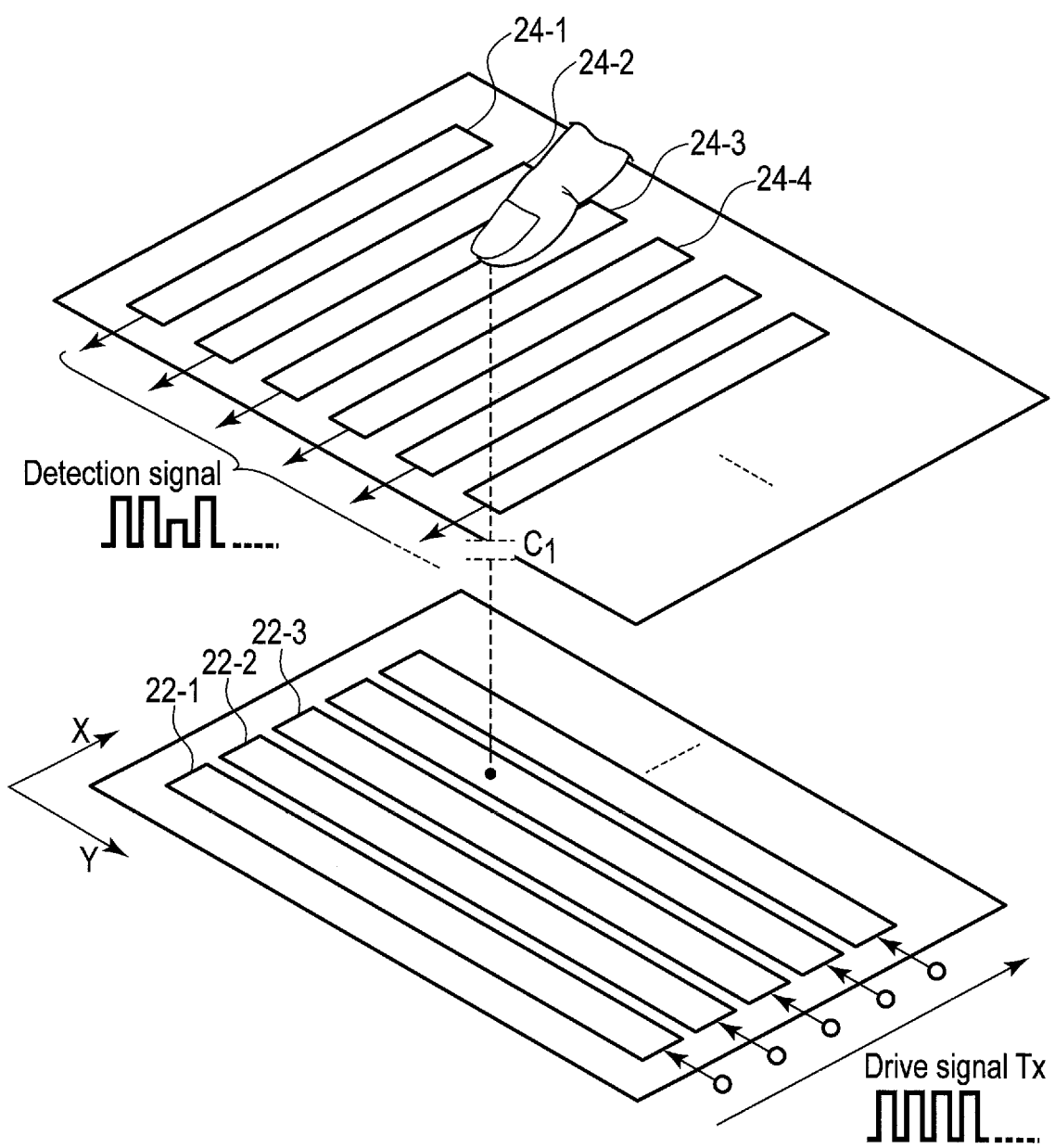
FIG. 4 is an exemplary view illustrating a principle of touch detection in a mutual sensing system.

A central part of the display panel constitutes a display region (or an active area) in which a TFT pixel array 18 is arranged. A touch panel 20 is integrally formed with the pixel array 18. The touch panel 20 includes driving electrodes 22-1, 22-2, . . . , (generically named 22), as illustrated in FIG. 4 etc., for touch detection on the first substrate 12 and detecting electrodes 24 for touch detection on the second substrate 14. The driving electrode 22 for touch detection also serves as a driving electrode for display. Thus, the driving electrode 22 hereinafter sometimes referred to as a common electrode. The detecting electrode 24 and the common electrode 22 are formed of transparent electrode materials, such as indium tin oxide (ITO) or indium zinc oxide (IZO), so that trouble may not occur to a displayed image.

A capacitance type touch sensor is classified into a mutual sensing (mutual capacitance) system and a self sensing (self capacitance) system. A pair of electrodes with a dielectric between them is provided in either system. In a mutual sensing system, when a driving pulse is supplied to one of a pair of the electrodes (also called a common electrode), an electric field will occur between the common electrode and the other of a pair of the electrodes (also called a detecting electrode). If an electric conductor, such as a user's finger, touches a touch panel, an electric field will also occur between the electric conductor and the common electrode because the electric field having been generated between the common electrode and the detecting electrode will reduce. As a result, electric charges between the common electrode and the detecting electrode will reduce. A touch position may be detected by detecting reduction of the amount of electric charges through the detecting electrode.

A self sensing system only uses either a common electrode or a detecting electrode. For example, if a common electrode is used, parasitic capacitance exists between the common electrode and a ground voltage. When an electric conductor touches the vicinity of a common electrode, an electric field occurs between the common electrode and the electric conductor. When the electric conductor approaches, the capacitance connected between the common electrode and the ground voltage increases. The amount of electric charges accumulated between the common electrode and the ground voltage changes. A touch position is detected by detecting change of the amount of electric charges through the common electrode. A touch sensor employing a self sensing system will be explained as a first embodiment, but a touch sensor employing a mutual sensing system may be applied to the first embodiment.

A display device externally has a host device 26. The display device is connected through two flexible printed circuit boards (FPC) 28 and 32 to the host device 26. The host device 26 is connected through the flexible printed circuit board 28 to the first substrate 12 and the second substrate 14. A touch sensing device 34 controlling the touch panel 20 is placed on the flexible printed circuit board 28. It is possible to make the touch sensing device 34 into an integrated circuit (IC). If the touch sensing device 34 is made into an IC, it may be called a touch controller IC.

The display controller 16 and the touch sensing device 34 are cooperatively synchronized with each other in operation, and are electrically connected with each other using, for instance, a timing pulse or the like. It is possible to integrate the display controller 16 and the touch sensing device 34 into a single integrated circuit chip rather than two respective integrated circuit chips.

The first substrate 12 has a back side (i.e., a back side of the display panel) where a back light unit 36 is placed as a lighting system for lighting up the display panel. The host device 26 is connected through the flexible printed circuit board 32 to the back light unit 36. Various types of back light units may be used as the back light unit 36. A light emitting diode (LED) or cold cathode fluorescence lamp (CCFL) may be used as a light source. Moreover, it is possible to use a lighting system having a light guide plate, placed at the back side of the display panel, and LED or CCFL placed beside the light guide plate. Alternatively, it is also possible to use a point light source wherein light emitting elements two dimensionally arranged over the back side of the display panel. A lighting system is not limited to a back light system. It is possible to use a front light system placed at a display surface side of the display panel. Furthermore, if a display device is a reflection type display device, or if a display panel uses organic electroluminescence, a lighting system is unnecessary.

A display device has a rechargeable battery, a power source circuit, etc., although not shown in FIG. 1.

[Pixel Array]

FIG. 2 is a circuit diagram indicative of the pixel array 18. The first substrate 12 has a central part where the pixel array 18 is formed. The pixel array 18 includes pixels 40 arranged in rows and columns to form a matrix (for example, 1080× 1920). Each of the pixels 40 is made of a red sub pixel $42_R$, a green sub pixel $42_G$ and a blue sub pixel $42_B$ ($42_R$, $42_G$ and $42_B$ may be generically named 42). Three colors other than red, green, and blue may be used for the color components of the sub pixels. Furthermore, four or more colors comprising red, green, blue, and at least one additional color may be used for the color components of the sub pixels.

Each of the sub pixels 42 has a switching element 45, a pixel electrode 47, and a common electrode 48. The switching element 45 includes a thin film MOSFET. The circuit diagram illustrates that each of the pixels 40 has a common electrode 48. Actually, however, the common electrodes 48 are not provided separately. Those portions of each of the common electrodes 22 facing the respective pixel electrodes 47 (see FIG. 3 and FIG. 4) correspond to the common electrodes 48 of the respective sub pixels 42. One common electrode 22 includes the common electrodes 48 included in the sub pixels 42 constituting one or more pixels 40 (FIG. 2 shows a case in which the sub pixels 42 constituting one pixel 40).

Figure 12:
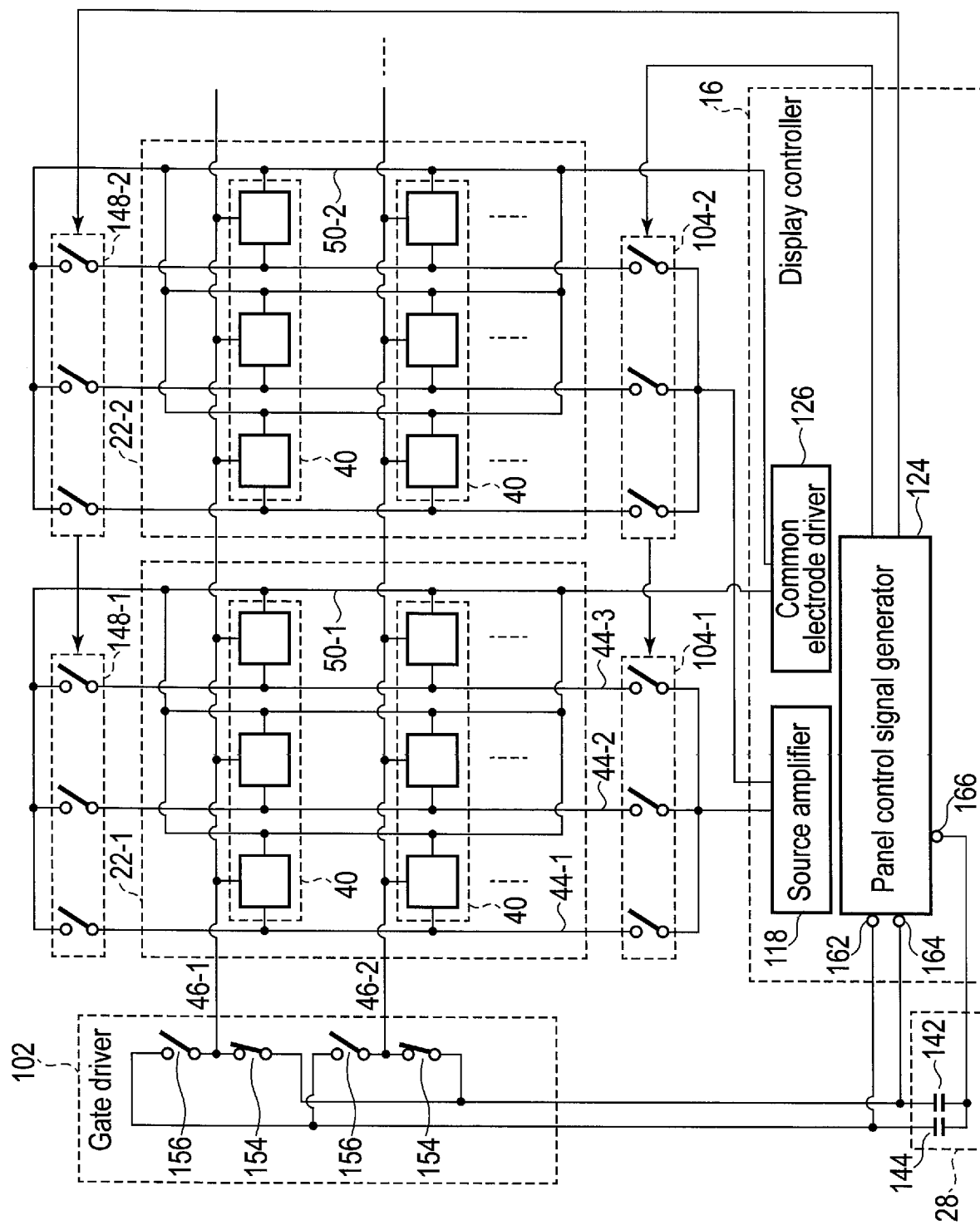
FIG. 12 is an exemplary block diagram illustrating a display controller.

Sources of the switching elements 45 of the sub pixels 42 arranged along a column of the pixel array 18 (Y axis) are connected to a common source line 44. The source lines 44 are connected through respective RGB select switches 104 to a source amplifier 118, as illustrated in FIG. 12 or the like. Gates of the switching elements 45 arranged along a row of the pixel array 18 (X axis) are connected to a common gate line 46 (also referred to as a scanning line). The gate lines 46 are connected to a gate driver 102, as illustrated in FIG. 12 or the like. In the sub pixel 42, a drain of the switching element 45 is connected to the pixel electrode 47.

Since the common electrodes 48 of the sub pixels are included in the common electrode 22, a plurality of common electrode lines 50 (three in FIG. 2) are equivalent to the common electrode 22. The gate lines 46 extend along X axis, and the source lines 44 extend along Y axis. Accordingly, the sub pixels 42 are formed near the respective intersections of the gate lines 46 and the source lines 44.

[Cross Sectional Structure]

Figure 3:
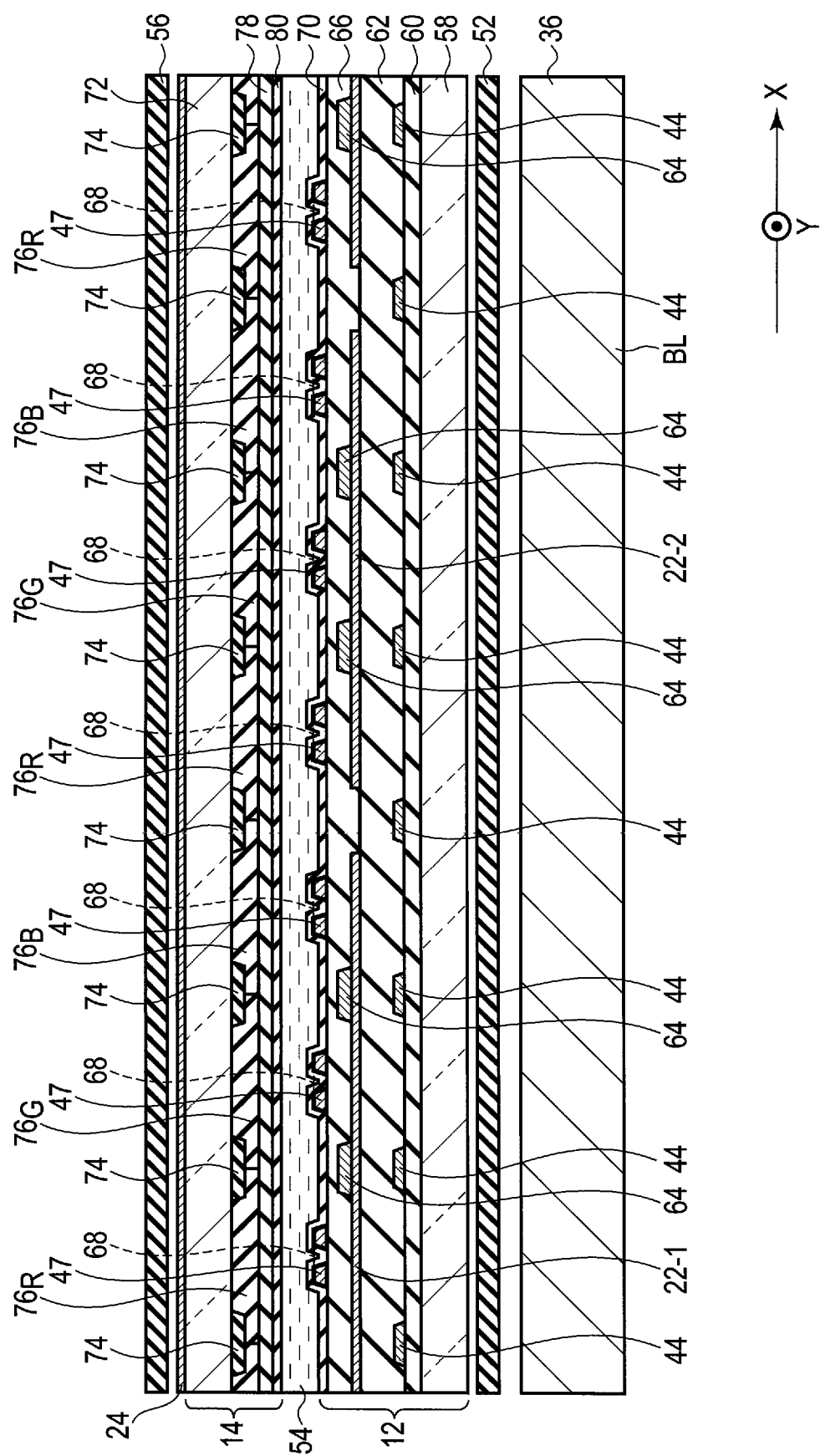
FIG. 3 is a sectional view schematically illustrating an exemplary structure of the display device.

FIG. 3 illustrates a cross sectional structure along X axis of the display device of FIG. 1. A first optical device 52, a first substrate 12, a liquid crystal layer 54, a second substrate 14, and a second optical device 56 are formed on the back light unit 36 in this order. Although FIG. 3 illustrates a structure of the display device using a fringe field switching (FFS) mode as a display mode, other display modes may be used. The first substrate 12 and the second substrate 14 are bonded together with a predetermined cell gap formed therebetween. The liquid crystal layer 54 is held in the cell gap between the first substrate 12 and the second substrate 14.

The first substrate 12 includes a first transparent insulating board 58, such as a glass substrate or a resin board. Although not illustrated, the source region, drain region and gate region of the switching element 45 are formed in a surface area of the first insulating board 58 in a side of the second substrate 14. The first insulating layer 60 is formed on the surface of the first insulating board 58. A plurality of source lines 44 are formed on a surface of the first insulating layer 60. Each of the source lines 44 extends along Y axis. Therefore, the source lines 44 are arranged along X axis. A second insulating layer 62 is formed on the surface of the first insulating layer 60.

A plurality of common electrodes 22 are formed on a surface of the second insulating layer 62. Each of the common electrodes 22 extends along Y axis. Therefore, the common electrodes 22 are arranged along X axis. The common electrode 22 is assigned to a plurality of source lines 44, for example, three source lines 44 corresponding to three sub pixels constituting one pixel. The common electrodes 22 may be assigned to such a number of the source lines 44 that is a multiple of three. Each of the common electrodes 22 is a stripe extending along Y axis. The common electrodes 22 are arranged along X axis. In order to make resistance low, a metal layer 64 is formed on the surface of the common electrodes 22. The metal layer 64 extends along Y axis. However, the metal layer 64 may be omitted.

A third insulating layer 66 is formed on the surface of the second insulating layer 62. A plurality of pixel electrodes 47 are formed on a surface of the third insulating layer 66. Each of the pixel electrodes 47 is located between the source lines 44. A portion of the common electrode 22 opposing the pixel electrode 47 corresponds to the common electrode 48 of the pixel 40 of FIG. 2. Each of the pixel electrodes 47 may have a slit 68. Each of the pixel electrodes 47 is formed of transparent materials, such as indium tin oxide (ITO) or indium zinc oxide (IZO), so that a display may not be obstructed. The pixel electrodes 47 and the third insulating layer 66 are covered with a first alignment film 70.

The second substrate 14 includes a second transparent insulating board 72, such as a glass substrate or a resin board. A black matrix 74 and color filters $76_R$, $76_G$ and $76_B$ (generically named 76) are formed in a surface of the second insulating board 72 opposing the first substrate 12. An overcoat layer 78 and a second alignment film 80 are formed at a surface of the second insulating board 72 facing the first substrate 12.

The black matrix 74 is placed to divide each of the sub pixels. The color filters $76_R$, $76_G$ and $76_B$ partially overlap the black matrix 74. The color filters $76_R$ transmits a light of a wavelength corresponding to red, the color filters $76_G$ transmits a light of a wavelength corresponding to green, and the color filters $76_B$ transmits a light of a wavelength corresponding to blue. The overcoat layer 78 covering the color filters $76_R$, $76_G$ and $76_B$ is formed of a transparent resin material.

A plurality of detecting electrodes 24 are formed in an external surface of the second insulating board 72 (the upper side of FIG. 3). Each of the detecting electrodes 24 is a stripe extending along X axis. The detecting electrode 24 is placed along Y axis.

The back light unit 36 is placed at the back side (the lower side of FIG. 3) of the display panel, as described above. The first optical device 52 is placed between the first insulating board 58 and the back light unit 36. The second optical device 56 is disposed above the detecting electrode 24. The first optical device 52 and the second optical device 56 include at least a polarizer. The first optical device 52 and the second optical device 56 may include a phase difference plate as needed.

[Touch Detection Principle]

FIG. 4 illustrates an exemplary basic structure of the touch panel 20 according to a mutual sensing system. The detecting electrodes 24-1, 24-2, . . . (generically named 24) formed in the second substrate 14 are stripes extending along X axis. The detecting electrodes 24 are arranged along Y axis. The common electrodes 22-1, 22-2, . . . (generically named 22) formed in the first substrate 12 are stripes extending along Y axis. The common electrodes 22 are arranged along X axis. Accordingly, the detecting electrodes 24 and the common electrodes 22 cross at right angles on the touch panel 20. The source lines extend along Y axis, and are parallel to the common electrodes 22. This arrangement is called a vertical COM type. The detecting electrodes 24 and the common electrodes 22 perpendicularly crossing each other on the touch panel 20 may be arranged conversely to FIG. 4. That is, the detecting electrodes 24 are stripes extending along Y axis and the common electrodes 22 are stripes extending along X axis. In this case, the source lines and the common electrodes 22 cross each other. This arrangement is called a horizontal COM type. In the following description, a vertical COM type is explained. However, a horizontal COM type can be applied to the embodiment.

The liquid crystal layer 54 is between the first substrate 12 and the second substrate 14. The detecting electrodes 24 and the common electrodes 22 are separated with a gap therebetween. Therefore, the capacitance C1 exists between the detecting electrodes 24 and the common electrodes 22. It is not necessary to provide one detecting electrode 24 to each row in the pixel array. It is possible to provide one detecting electrode 24 to two or more rows in the pixel array. It is not necessary to provide one common electrode 22 to each column in the pixel array. It is possible to provide one common electrode 22 to two or more columns in the pixel array.

The common electrodes 22-1, 22-2, . . . are sequentially driven with a drive signal. A finger touches or is close to a crossing section at which the detecting electrode 24-3 and the common electrode 22-4 cross each other. If a drive signal is supplied to the common electrode 22-4, detection signals are output from the detecting electrodes 24. The detection signal output from the detecting electrode 24-3 is lower in level than the detection signals output from other detecting electrodes 24-1, 24-2, 24-4, 24-5, . . . . The detecting electrodes 24 monitor a fringing field from the common electrodes 22. If a conductive object such as a finger approaches, the fringing field is blocked, and capacitance will change. The detection level of the detecting electrode 24 is decreased. The mutual sensing touch sensor treats the difference in detection level as a detection signal indicative of a touch position. The drive signal supplied to one common electrode may be made of either a single pulse or a plurality of pulses. The whole of the pulses supplied to a plurality of common electrodes is called a drive signal Tx. Accordingly, the drive signal Tx is a high frequency pulse signal.

The capacitance C1 is different in value between a case where a finger is close to one of the detecting electrodes 24 and a case where a finger is far from any of the detecting electrodes 24. Accordingly, the detection signal will also be different in level depending on whether the finger is close to one of the detecting electrodes 24 or the finger is far from any of the detecting electrodes 24. Accordingly, it possible to determine the degree of proximity of the finger to the screen of a display panel based on the level of the detection signal. The position of the screen touched by the finger may be detected based on the driving timing of the common electrodes 22 by means of the drive signal and the position of a corresponding one of the detecting electrodes 24 outputting a low level detection signal.

Figure 5:
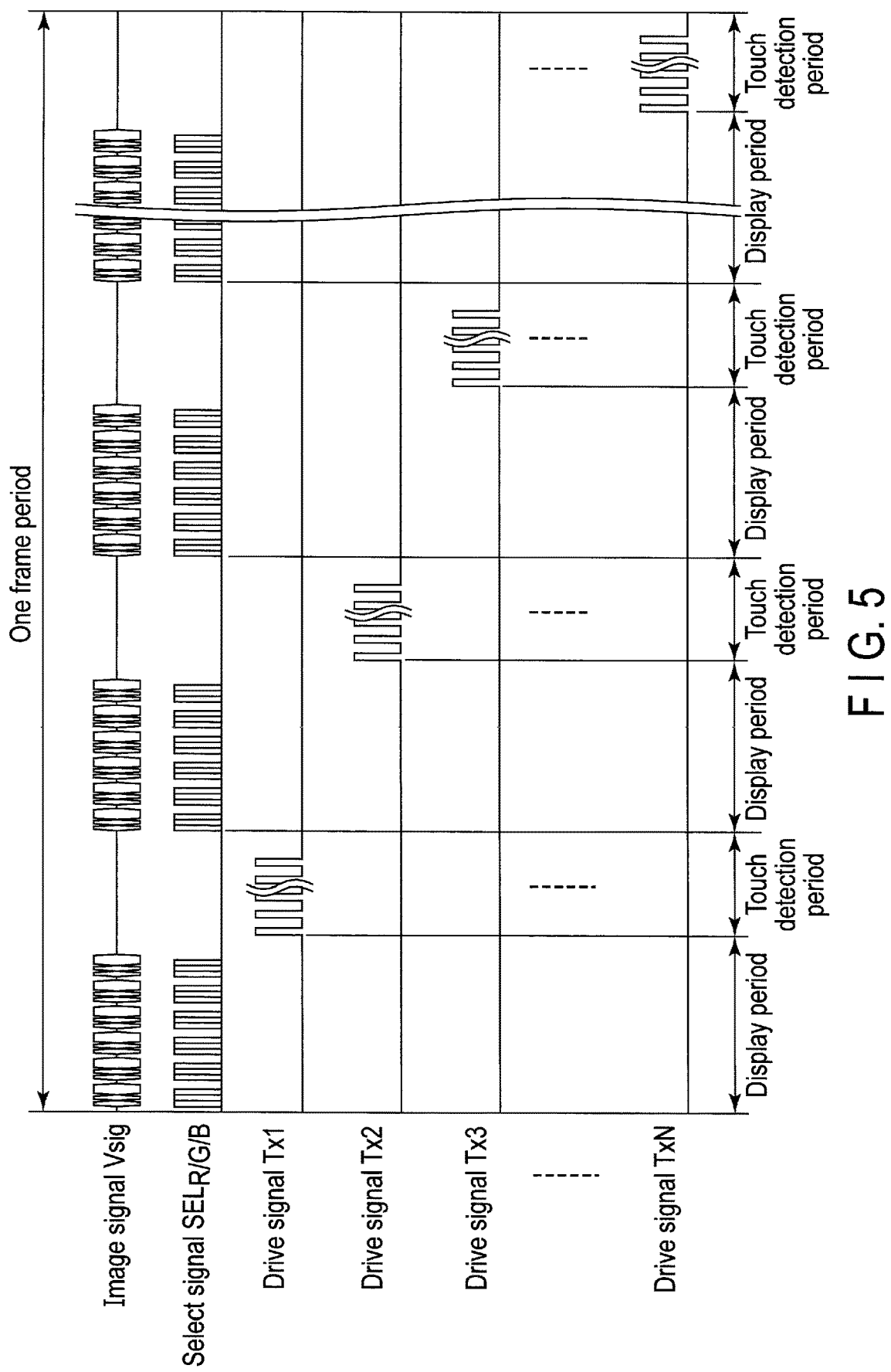
FIG. 5 is an exemplary view illustrating how display periods and touch detection periods are arranged in one frame period.

The common electrodes 22 are also used as driving electrodes driving a liquid crystal for display. Therefore, as illustrated in FIG. 5, a plurality of display periods are included in one frame period, touch detection periods (also called non-display periods) are arranged between the display periods. A display operation and a touch detection operation are performed in time sharing.

During a display period, the image signal Vsig from the host device 26 for a plurality of lines is written in a display panel. The drive signal of a constant direct current voltage for display is supplied to all the common electrodes 22. An image of a plurality of lines is displayed according to the image signal. The image signal Vsig is formed of a set of pixel signals which are time division multiplex signals of the sub pixel signals for a red, a green, and a blue sub pixel. The image signal Vsig is divided into three colored sub pixel signals based on the RGB select control signal $SEL_{R/G/B}$. The number of lines displayed during one display period is determined such that one frame is completely displayed within one frame period.

During a touch detection period, the drive signals Tx1, Tx2, Tx3, . . . are supplied to select one or more common electrodes 22. The selected one or more common electrodes 22 change in voltage. The number of common electrodes 22 selected during a touch detection period is not limited to one. A plurality of common electrodes may be collectively driven during a touch detection period. It may be arbitrarily established how many common electrodes are selected and driven during a touch detection period.

In a mutual sensing touch sensor, common electrodes will not be driven simultaneously. The common electrodes may be successively driven one by one or group by group. The former is called a simultaneous drive and the latter a sequential drive. The sequential drive is not limited to driving a plurality of common electrodes in order, but includes driving a plurality of common electrodes at random. Both a simultaneous drive and a sequential drive may be applicable to the self sensing touch sensor described later. Therefore, FIG. 5 may be applicable not only to a mutual sensing touch sensor but also a sequentially driven self sensing touch sensor.

There are two drive methods for changing a voltage of a selected common electrode during a touch detection period based on a drive signal. One is a drive method (also called a DC drive), in which a pair of switches connected in series are connected to every common electrode. A high level voltage line and a low level voltage line are connected with each other by the pair of switches. A middle point of the pair of switches is connected to the common electrode. The pair of switches is turned on/off by the drive signal. The high level voltage or the low level voltage is supplied to the selected common electrode according to the level of the drive signal. The other is a drive method (also called an AC drive) directly supplying a drive signal to the selected common electrode.

Now, the principle of self sensing touch detection will be explained with reference to FIG. 6A-FIG. 10. In a self sensing system, either the common electrode 22 or the detecting electrode 24 is used. For example, capacitance Cx1 of the common electrode 22 and capacitance Cx2 generated by an electric conductor, such as a finger of the user, close to the common electrode 22 may be used.

FIGS. 6A and 6B illustrate a case where a user's finger neither touches nor approaches a touch panel. The capacitance Cx2 is not generated between the finger and the common electrode 22. FIG. 6A illustrates a case where a power source Vdd is connected to the common electrode 22 through a control switch SWc. FIG. 6B illustrates a case where the power source Vdd is disconnected from the common electrode 22 by the control switch SWc and a capacitance Ccp is connected to the common electrode 22 through the control switch SWc.

The capacitance Cx1 is charged in the state illustrated in FIG. 6A. The capacitance Cx1 is discharged in the state illustrated in FIG. 6B. Charging of the capacitance Cx1 means that a constant signal is written into the common electrode 22 and that the common electrode 22 is driven for touch detection. Discharge of the capacitance Cx1 means that a signal indicative of change of the capacitance generated in the common electrode 22 is read. In order to execute the signal writing and the signal reading, exclusive lines used for acquiring a detection signal may be provided.

On the other hand, FIGS. 7A and 7B illustrate a case where a user's finger touches or is close to a touch panel. The capacitance Cx2 is generated between the finger and the common electrode 22. FIG. 7A illustrates a case where the power source Vdd is connected to the common electrode 22 through the control switch SWc. FIG. 7B illustrates a case where the power source Vdd is disconnected from the common electrode 22 by the control switch SWc and a capacitance Ccp is connected to the common electrode 22 through the control switch SWc.

The capacitance Cx1 is charged in the state illustrated in FIG. 7A. The capacitance Cx1 is discharged in the state illustrated in FIG. 7B. Voltage change characteristics of the capacitance Ccp at the time of discharge illustrated in FIG.

7B is clearly different from that of the capacitance Ccp at the time of discharge illustrated in FIG. 6B because of existence of the capacitance Cx2. Therefore, in a self sensing system, input position information (for example, existence or absence of an operational input) is determined using a change of the voltage change characteristics of the capacitance Ccp caused by the existence or absence of the capacitance Cx2.

FIG. 8A illustrates an exemplary basic touch detection circuit according to the self sensing system. This circuit is provided in the touch sensing circuit 34 illustrated in, for example, FIG. 1. As illustrated in FIG. 8A, the common electrode 22 is connected to a first terminal of a capacitance Cp for voltage division and a first input terminal of a comparator COMP. The common electrode 22 has its own capacitance Cx. The comparator COMP has a second input terminal connected to a power supply of a reference voltage Vref.

A second terminal of the capacitance Cp is connected through the switch SW1 to a power source line Vcc. The second terminal of the capacitance Cp is connected through a resistor Rc to a first terminal of the capacitance Cc. A second terminal of the capacitance Cc is connected to a reference potential (for example, a ground potential).

A switch SW2 is connected between the second terminal of the capacitance Cp and the reference potential. A switch SW3 is connected between the first terminal of the capacitance Cp and the reference potential.

Operation of the circuit illustrated in FIG. 8A will be explained. The switch SW1 is turned on in a fixed cycle, and charges the capacitance Cc. When the capacitance Cc is being charged, the switches SW2 and SW3 are turned off. When the capacitance Cc is charged up, all the switches SW1, SW2, and SW3 are turned off, and the charges of the capacitance Cc are kept.

Subsequently, the switches SW2 and SW3 are turned on for a fixed period of time. The switch SW1 remains turned off. Then, almost all the charges of both the capacitances Cp and Cx are discharged, and a part of the charges of the capacitance Cc is discharged through the resistor Rc.

Subsequently, all the switches SW1, SW2, and SW3 are turned off. Then, the charges of the capacitance Cc move to the capacitances Cp and Cx. The equivalent circuit at this moment may be expressed as illustrated in FIG. 8B. Thereafter, the comparator COMP compares voltage Vx of the capacitance Cx with the reference voltage Vref or a threshold voltage Vth.

As apparent from the equivalent circuit illustrated in FIG. 8B, when all the switches SW1, SW2, and SW3 are turned off, the charges of the capacitance Cc move to the capacitances Cp and Cx, and then the comparator COMP compares a variation in the voltage Vx of the capacitance Cx with the reference voltage Vref. A series of these operations are repeated until the condition Vx<Vref is satisfied.

That is, after charging of the capacitance Cc is executed, the switches SW2 and SW3 are kept in the on state for a fixed period of time. The switch SW1 remains turned off. Then, almost all the charges of the capacitances Cp and Cx are discharged, and a part of the charges of the capacitance Cc is discharged through the resistor Rc. Subsequently, all the switches SW1, SW2, and SW3 are turned off. Then, the charges of the capacitance Cc move to the capacitances Cp and Cx.

The relationships between the voltages Vp, Vc, and Vx, and the capacitances Cp, Cc, Cx are expressed as follows.

$$Vc = Vp + Vx \quad (1)$$

$$Vp:Vx = (1/Cp):(1/Cx) \quad (2)$$

$$Vx = (Cp/(Cp+Cx)) \times Vc \quad (3)$$

As described above, after the capacitance Cc is charged up to the voltage Vc through the switch SW1, the switch SW1 is kept off state and the switches SW2 and SW3 are repetitively turned on or off. Then, the voltage Vc of the capacitance Cc will gradually be decreased, and the voltage Vx of the capacitance Cx is decreased also. This operation, i.e., repeatedly turning on/off the switches SW2 and SW3 after the capacitance Cc is charged up to the voltage Vc is continued until the voltage Vx becomes lower than the reference voltage Vref.

FIG. 9 exemplarily illustrates a waveform of the voltage Vc of the capacitance Cc, and a waveform of the output of the comparator COMP. The horizontal axis indicates time, and the vertical axis indicates the voltage.

When the switch SW1 is turned on, the capacitance Cc is charged up to the voltage Vcc. Thereafter, all the switches SW1, SW2, and SW3 are turned off, and the charges of the capacitance Cc move to the capacitances Cp and Cx. Subsequently, the comparator COMP compares a variation in the voltage Vx of the capacitance Cx with the reference voltage Vref.

A change characteristic or degree of change in the voltage Vc depends on the sum total value of the capacitances Cp and Cx. The change of the capacitance Cc will affect the voltage Vx of the capacitance Cx. The capacitance Cx will change in value according to how close a user's finger is to the common electrode 22.

Accordingly, as illustrated in FIG. 9, when the finger is far from the common electrode 22, a characteristic VCP1 with slow changes is obtained. When the finger is close to the common electrode 22, a characteristic VCP2 with quick changes is obtained. The decreasing rate of the Vc is larger in the case where the finger is close to the common electrode 22 as compared with the case where the finger is far from the common electrode 22 because the finger has its own capacitance and the presence of the finger will increase the capacitance Cc.

The comparator COMP compares the voltage Vp with the reference voltage Vref or the threshold voltage Vth in synchronization with repetitive turning on/off of the switches SW2 and SW3. When Vp is greater than Vref (Vp>Vref), the comparator COMP outputs a pulse. However, when Vp becomes lower than Vref (Vp<Vref), the comparator COMP stops outputting of the pulse.

The output pulse of the comparator COMP is monitored by a measuring application or a measuring circuit (not illustrated) inside the touch sensing circuit 34. That is, after the capacitance Cc has been charged once, repetitive discharging is carried out by the switches SW1 and SW2 for a short period of time, and voltage Vp is repetitively measured.

At this moment, it is possible to measure the period (MP1 or MP2) of the output pulse from the comparator COMP or the number of the output pulses of the comparator COMP. The number of the output pulses corresponds to the number of pulses from the time when the capacitance Cc is fully charged to the time when Vp becomes lower than Vref (Vp<Vref).

If a finger is far from the common electrode 22, the period MP1 or MP2 is long. If a finger is close to the common electrode 22, the period is short. If the finger is far from the common electrode 22, the number of the output pulses of the comparator COMP is large. If the finger is close to the common electrode 22, the number of the output pulses of the comparator COMP is small.

Accordingly, it is possible to determine the degree of proximity of the finger to the touch sensor based on the level of the detection signal. If the common electrodes 22 are two-dimensionally arranged in a matrix, a two-dimensional position where the finger is placed on the touch sensor can be detected.

As described above, although it is detected whether or not the user's finger influences the common electrodes 22, the detection time is on the order of several tens of µs to several ms.

Figure 10:
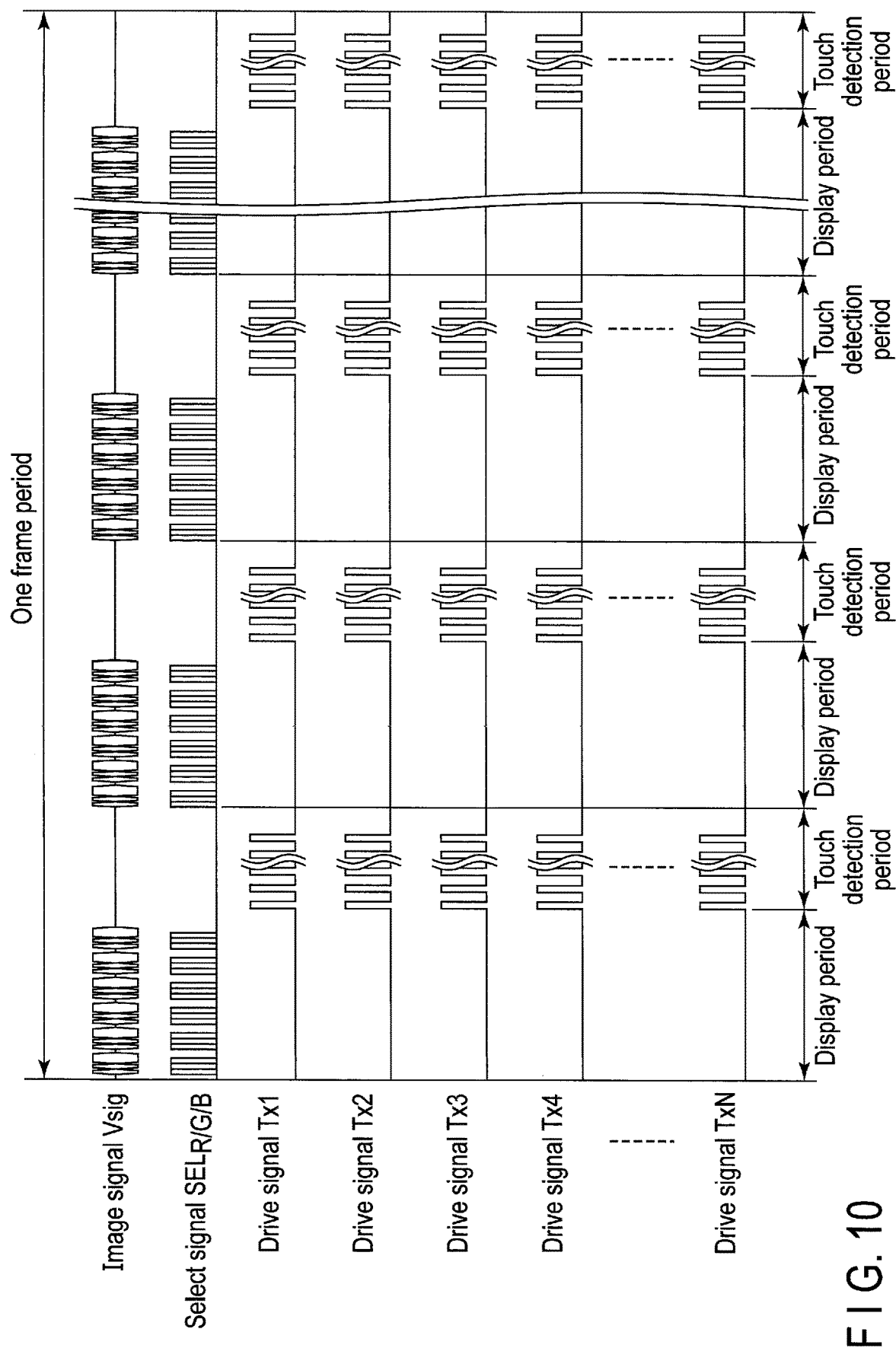
FIG. 10 is an exemplary view illustrating how display periods and touch detection periods are arranged during one frame period in a simultaneous drive self sensing system.

FIG. 10 illustrates a common electrode drive method of a simultaneously driven self sensing system. In the same manner as FIG. 5, a plurality of display periods are included in one frame period, and touch detection periods (also called non-display periods) are arranged between the display periods. In every touch detection period, the drive signals Tx1, Tx2, Tx3, . . . are supplied to the common electrodes 22-1, 22-2, 22-3, . . . .

The first embodiment may be similarly applicable to a mutual sensing touch sensor.

[Circuit Configuration]

FIG. 11 is a circuit diagram exemplarily illustrating a construction of the display device. A gate driver 102 is provided outside one of the two longer sides of the pixel array 18 on the first substrate 12 (for example, a left-hand longer side). The RGB select switch (also called a multiplexer) 104 is provided outside one of the two shorter sides of the pixel array 18 on the first substrate 12 (for example, a bottom shorter side).

The display controller 16 includes a host I/F 112 connected to the host device 26, and a touch panel I/F 122 connected to the touch sensing device 34. The image signal output from the host device 26 is received by the host I/F 112, and is supplied through an image memory 114, a line latch circuit 116, the source amplifier 118, and the RGB select switch 104 to the pixel array 18. The host I/F 112 subjects the image signal output from the host device 26 to an interpolation process, a compositing process, etc., and makes the image signal to be suitably displayed on the display device. The image memory 114 includes an SRAM or a DRAM or the like, and can store an image signal of one frame.

The line latch circuit 116 latches the image signal of one line output from the image memory 114. An output of the line latch circuit 116 is converted into an analog signal having gradation by the source amplifier 118. The image signal output from the host device 26 is a time division multiplex signal having three colored sub pixel signals of red, green and blue. The image signal is separated into three colored respective sub pixel signals by the RGB select switch 104 based on an RGB select control signal $SEL_{R/G/B}$, and the separated three colored sub pixel signals are supplied to the pixel array 18. As illustrated in FIG. 2, the switching elements 45 arranged in the row of the pixel array 18 are turned on by the gate driver 102 through the gate line 46. Sub pixel signals are supplied through the turned-on switching elements 45 to corresponding pixel electrodes 47. Since a constant direct current voltage is supplied to all the common electrodes 22 for display during a display period, an image is displayed by the sub pixels 42 according to the pixel signals.

The control signal of the gate driver 102 and the RGB select control signal of the RGB select switch 104 are output from a panel control signal generator 124. The panel control signal generator 124 also supplies a control signal to the detecting electrodes 24 of the touch panel 20. The detection signal of the touch panel 20 is supplied to the touch sensing device 34. The common electrode of the pixel array 18 is driven by the common electrode driver 126. The control signal of the common electrode driver 126 is output from the panel control signal generator 124. A DC driving method is used for driving the common electrode.

Although not illustrated, the common electrode driver 126 includes a pair of switches connected in series and connected between a high level voltage line and a low level voltage line. An AC driving method may be used for driving the common electrode. The display controller 16 includes a timing controller 128 determining operation timing of each part based on a synchronizing signal, a command, etc., output from the host device 26, for example.

FIG. 12 illustrates a portion of the display controller 16 which drives the pixel matrix. The pixel signal output from the source amplifier 118 is divided into three sub pixel signals of R, G, and B by the RGB select switches 104-1, 104-2, . . . (generically named 104). The sub pixel signals indicative of three respective colors are supplied through the respective source lines 44-1, 44-2, and 44-3 (generically named 44) to the respective sources of the switching elements 45 in the sub pixels $42_R$, $42_G$ and $42_B$. The sub pixels $42_R$, $42_G$ and $42_B$ are constructed similarly to what is illustrated in FIG. 2. The sub pixel signals are supplied to only those pixel electrodes 47 of the sub pixels 42 through the switching elements 45 which are turned on by the gate driver 102. A predetermined number of source lines corresponding to one pixel 40, in FIG. 12, three source lines 44-1, 44-2, and 44-3, are connected to the common electrode 22 through a SIG-COM switch 148. The common electrode 22 is driven by the common electrode driver 126. The RGB select switch 104 and the SIG-COM switches 148-1, 148-2, . . . (generically named 148) are turned on/off by the panel control signal generator 124.

The panel control signal generator 124 includes two voltage terminals 162 and 164 and a guard terminal 166. The voltage terminal 162 is a positive voltage terminal, and the voltage terminal 164 is a negative voltage terminal. The guard terminal 166 is connected through a coupling capacitor 144 in the flexible printed circuit board 28 to the positive voltage terminal 162, and is also connected through a coupling capacitor 142 in the flexible printed circuit board 28 to the negative voltage terminal 164. The positive voltage terminal 162 and the negative voltage terminal 164 are also connected to the gate driver 102. The gate driver 102 controls the potential of each of the gate lines 46 according to the voltage of the positive voltage terminal 162 and the voltage of the negative voltage terminal 164. It is possible to provide two gate drivers 102 at both sides of the pixel array 18. In such a case, a half of the gate drivers 102 is connected to the gate lines corresponding to odd-numbered pixel rows, and the other half of the gate drivers 102 is connected to the gate lines corresponding to even-numbered pixel rows. The gate driver 102 includes a pair of switches 156 and 154 for driving each of the gate lines. The pair of switches 156 and 154 is connected in series and is connected between the positive voltage terminal 162 and the negative voltage terminal 164. The switches 156 and 154 are turned on/off by the panel control signal generator 124.

The gate driver 102 supplies turn-on voltages to a plurality of gate lines 46 one after another during a display period, thereby selecting gate lines one after another. The turn-on voltage is applied to the gates of the switching elements 45 of the sub pixels 42 connected to the selected one of the gate lines 46. Thus, the switching elements 45 of the sub pixels 42 connected to the selected gate line 46 is conductive.

The source amplifier 118 supplies sub pixel signals through the RGB select switches 104 to the source lines 44 during a display period. The sub pixel signals supplied to the source lines 44 are supplied through the switching elements 45 that are conductive to the corresponding pixel electrodes 47. The common electrode driver 126 supplies a constant direct current voltage to the common electrodes 22 during a display period.

The common electrode driver 126 supplies the drive signal Tx to one or more common electrodes 22 during a touch detection period. The gate driver 102 drives (also called guard-drives) all the gate lines 46 during a touch detection period with a guard signal. The guard signal is a pulse signal that is the same in phase and amplitude as a pulse signal which constitutes the drive signal Tx. The amplitude does not mean an absolute value of the amplitude level of the pulse but a difference between a high level and a low level.

[Guard Drive of Gate Line]

FIG. 13 illustrates a portion of the panel control signal generator 124 which relates to a guard drive of a gate line. A positive external power source VSP (for example, +5.5V) and a negative external power source VSN (for example, −5.5V) are respectively connected to a booster circuits 170 and 180. The booster circuit 170 is a two-fold booster circuit, and outputs a positive high voltage VGH of +11.0V, for example. The high voltage VGH is decreased in voltage by an LDO regulator 172, and becomes a positive output voltage VGHO of +8.5V, for example.

The positive output voltage VGHO is supplied to a first terminal of a selector 174 connected to the positive voltage terminal 162. A second terminal of the selector 174 is in a high impedance state. The selector 174 selects the first terminal during a display period to set the positive voltage terminal 162 at the positive output voltage VGHO, and selects the second terminal during a touch detection period to set the positive voltage terminal 162 at a high impedance state. Although not illustrated, the high voltage VGH is also supplied to the pixel array 18 and the touch panel 20, and is used for various power sources.

The booster circuit 180 is also a two-fold booster circuit, and outputs a negative high voltage VGL of −11.0V, for example. The negative high voltage VGL is decreased in voltage by an LDO regulator 182, and becomes a negative output voltage VGLO of −8.5V, for example. The negative output voltage VGLO is supplied to a first terminal of a selector 184 connected to the negative voltage terminal 164. A second terminal of the selector 184 is in a high impedance state. The selector 184 selects the first terminal during a display period to set the negative voltage terminal 164 at the negative output voltage VGLO, and selects the second terminal during a touch detection period to set the negative voltage terminal 164 at a high impedance state.

One or more common electrodes are selected during one touch detection period. The drive signal Tx is supplied to the selected one or more common electrodes. In the common electrode driver 126, the pulse signal of a certain frequency is amplified to a predetermined voltage level, whereby and the drive signal Tx is generated. A difference (also called amplitude) between the high level (for example, VSP=5.5V) and the low level (for example, a ground level) is denoted by VHI. In the panel control signal generator 124, a pulse signal which is a basis of the drive signal is supplied to a terminal 175. The terminal 175 is connected to a guard amplifier 176. The pulse signal input to the terminal 175 is amplified by the guard amplifier 176, whereby the guard signal is generated. Therefore, the guard signal and the drive signal Tx are the same in phase. An amplifier in the common electrode driver 126 and the guard amplifier 176 in the panel control signal generator 124 may be configured to amplify the signals such that the difference between the high level and the low level in the drive signal Tx is substantially the same as the difference between the high level and the low level in the guard signal.

The guard signal output from the guard amplifier 176 is supplied to a first terminal of a selector 178 connected to the guard terminal 166. A second terminal of the selector 178 is grounded. The selector 178 is controlled by a guard enable signal. The selector 178 selects the first terminal during an enable period to output the guard signal from the guard terminal 166, and selects the second terminal during a disable period to cause the guard terminal 166 to be grounded. The selectors 174, 178, and 184 are switched over by the panel control signal generator 124. The selector may be constituted by a CMOS switch connected between the first terminal and the second terminal and selecting either the first terminal or the second terminal according to a control signal.

The guard terminal 166 is connected to the positive voltage terminal 162 through the coupling capacitor 144 in the flexible printed circuit board 28, and is connected to the negative voltage terminal 164 through the coupling capacitor 142 in the flexible printed circuit board 28. The positive voltage terminal 162 is connected through the switch 156 to the gate line 46, and the negative voltage terminal 164 is connected through the switch 154 to the gate line 46.

With reference to the timing chart of FIG. 14, the guard drive of the gate line by the panel control signal generator 124 of FIG. 13 is explained. FIG. 14 illustrates the state of the selector 178 (waveform (a)), the state of the selectors 174 and 184 (waveform (c)). The selector 178 is switched to the disabling side during a display period, and is switched to the enabling side during a touch detection period. The pulse signal which is the basis of the drive signal Tx is supplied to the terminal 175 only during an enable period. When the selector 178 switches from disabling to enabling, the guard signal in accordance with the pulse signal input to the terminal 175 is output from the guard terminal 166, as illustrated by waveform (b) of FIG. 14. When the selector 178 switches from enabling to disabling, the guard terminal 166 stops outputting the guard signal.

The positive voltage terminal 162 outputs the positive output voltage VGHO which is an output of the LDO regulator 172 during a display period, as illustrated by waveform (d) of FIG. 14. The coupling capacitor 144 is charged by the positive output voltage VGHO. The capacitance of the coupling capacitor 144 is determined such that the current leakage from the coupling capacitor 144 can be disregarded and the charges of the coupling capacitor 144 may be kept during a touch detection period. Therefore, the positive voltage terminal 162 outputs during a touch detection period a pulse signal in which the guard signal output from the guard terminal 166 is superposed on the positive output voltage VGHO having been charged in the coupling capacitor 144, as illustrated in waveform (d) of FIG. 14.

As illustrated in waveform (e) of FIG. 14, the negative voltage terminal 164 outputs the negative output voltage VGLO which is an output of the LDO regulator 182 during a display period. The coupling capacitor 142 is charged by the negative output voltage VGLO. The capacitance of the coupling capacitor 142 is determined such that the current leakage from the coupling capacitor 142 can be disregarded and the charges of the coupling capacitor 142 may be kept during a touch detection period. Therefore, the negative voltage terminal 164 outputs during a touch detection period a pulse signal in which the guard signal output from the guard terminal 166 is superposed on the negative output voltage VGLO having been charged in the coupling capacitor 142, as illustrated in waveform (e) of FIG. 14.

The gate line 46 is connected to the positive voltage terminal 162 of the panel control signal generator 124 through the switch 156 in the gate driver 102, and is also connected to the negative voltage terminal 164 of the panel control signal generator 124 through the switch 154 in the gate driver 102. The switch 156 is usually turned off and is turned on only when the gate line 46 is turned on during a display period, as illustrated in waveform (f) of FIG. 14. The switch 154 is usually turned on and is turned off only when the gate line 46 is turned on during a display period, as illustrated in waveform (g) of FIG. 14. Accordingly, as illustrated in waveform (h) of FIG. 14, the negative output voltage VGLO is usually supplied to the gate line 46 during a display period. Only when the switch 154 is turned off and the switch 156 is turned on during a display period, the positive output voltage VGHO is supplied to the gate line 46, whereby the switching element 45 is turned on.

During a touch detection period, the gate line 46 is supplied with a pulse signal in which the guard signal output from the guard terminal 166 is superposed on the negative output voltage VGLO generated at the negative voltage terminal 164. The signal generated at the terminal 164 is a negative voltage. Therefore, even if a signal in which the guard signal is superposed on the signal of the terminal 164 is supplied to the gate line 46, the switching elements 45 of sub pixels are not turned on.

The guard signal is a pulse signal which is the same in phase and amplitude as the drive signal Tx supplied to the common electrode during a touch detection period. Accordingly, the gate line 46 is driven by a pulse in the same amplitude and phase as the drive signal Tx during a touch detection period. Therefore, parasitic capacitance is less likely connected between the common electrode and the gate line. The load of the common electrode is reduced.

The RGB select switch 104 sequentially selects the R, G and B sub pixels during a display period and is turned off during a touch detection period, as illustrated in waveform (i) of FIG. 14. Therefore, the source line 44 is in a high impedance state during a touch detection period. The SIG-COM switch 148 is turned off during a display period and is turned on during a touch detection period, as illustrated in waveform (j) of FIG. 14. All the SIG-COM switches 148 may be turned on during a touch detection period, whereas, in the case of a sequential drive, only those SIG-COM switches 148 that are connected to the common electrodes 22 to each the drive signal Tx is supplied may be turned on. Therefore, the common electrode 22 and the source line 44 are short-circuited during a touch detection period. The drive signal Tx (waveform (k) of FIG. 14) supplied to the common electrode 22 is also supplied through the SIG-COM switch 148 to the source line 44. Thereby, the influence of the parasitic capacitance between the common electrode 22 and the source line 44 is reduced, and it becomes possible to drive the common electrode 22 at a desired waveform with the drive signal Tx.

The common electrode 22 is made of, for example, transparent electrode materials, such as ITO or IZO. The source line 44 is usually made of metal. Therefore, the common electrode 22 is higher in resistance than the source line 44. When the common electrode 22 and the source line 44 are short-circuited during a touch detection period, the common electrode 22 will decrease in resistance, and electric power consumption will decrease.

As illustrated in waveform (k) of FIG. 14, the common electrode driver 126 for driving the common electrode 22 outputs constant direct current voltage during a display period, and outputs the drive signal Tx, which is a high frequency pulse, during a touch detection period.

As described above, during a touch detection period, the drive signal Tx is supplied to the common electrodes 22-1, 22-2, . . . and the guard signal is supplied to the gate lines 46, which intersect the common electrodes 22. The guard signal is a pulse signal that is the same in amplitude and phase as the drive signal. Therefore, parasitic capacitance is less likely connected between the common electrode 22 and the gate line 46 in the pixel array 18. Therefore, the common electrode 22 driven by the drive signal in a touch detection period improves in response characteristics. Detection accuracy is improved and detection time is shortened. Furthermore, since the source line 44 and the common electrode 22 are short circuited during a touch detection period, parasitic capacitance is less likely connected between the source line 44 and the common electrode 22 in the pixel array 18, or between the source line 44 and the gate line 46 in the pixel array 18. Therefore, the influence of the parasitic capacitance in the pixel array 18 caused by the drive signal of the common electrode can be suppressed during a touch detection period.

[Select Switch]

Figure 15:
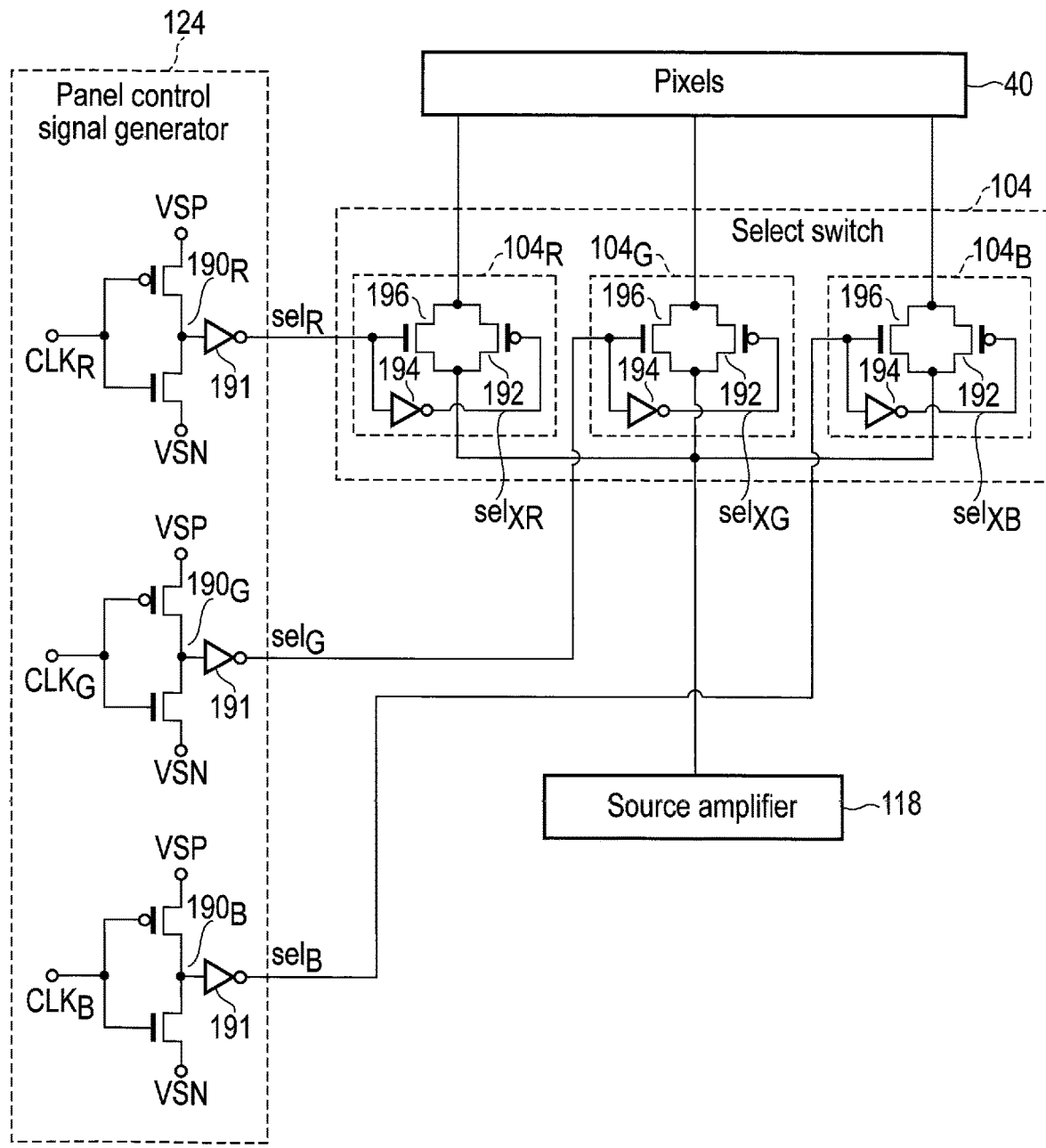
FIG. 15 is an exemplary circuit diagram illustrating a portion in the panel control signal generator, the portion relating to a generation of a select control signal supplied to a select switch in the panel control signal generator.

FIG. 15 illustrates a portion relating to generation of a select control signal of the RGB select switch 104 in the panel control signal generator 124. CMOS switches 190$_R$, 190$_G$, and 190$_B$ are connected as selectors between the external power sources VSP and VSN. The CMOS switch 190 includes a PMOSFET and an NMOSFET connected in series. In the CMOS switch 190, the PMOSFET is connected to the power source VSP, the NMOSFET is connected to the power source VSN, and the gate of the PMOSFET and the gate of the NMOSFET are commonly connected to a clock terminal CLK. The CMOS switch 190 outputs either VSP or VSN from the connection point of both FETs according to the level of the clock terminal CLK. The output of the COMS switch 190 is supplied through an inverter 191 to the select switch 104 as the select control signals sel$_R$, sel$_G$, or sel$_B$. The power source of the inverter 191 is connected to the power sources VSP and VSN so that the voltage driving the next stage can be output.

The select switch 104 includes switches 104$_R$, 104$_G$, and 104$_B$ which respectively transmit or shut red, green, and blue sub pixel signals. Each of the switches 104$_R$, 104$_G$, and 104$_B$ includes a CMOS transfer gate including a PMOSFET 192 and an NMOSFET 196. The select control signal sel$_R$, sel$_G$, or sel$_B$ is supplied to a gate of the NMOSFET 196, and is supplied through an inverter 194 to a gate of the PMOSFET 192, as an inverted select control signal sel$_{XR}$, sel$_{XG}$, or sel$_{XB}$. The inverter 194 has a power source connected to the power sources VSP and VSN so that the voltage driving the next stage can be output.

Figure 16:
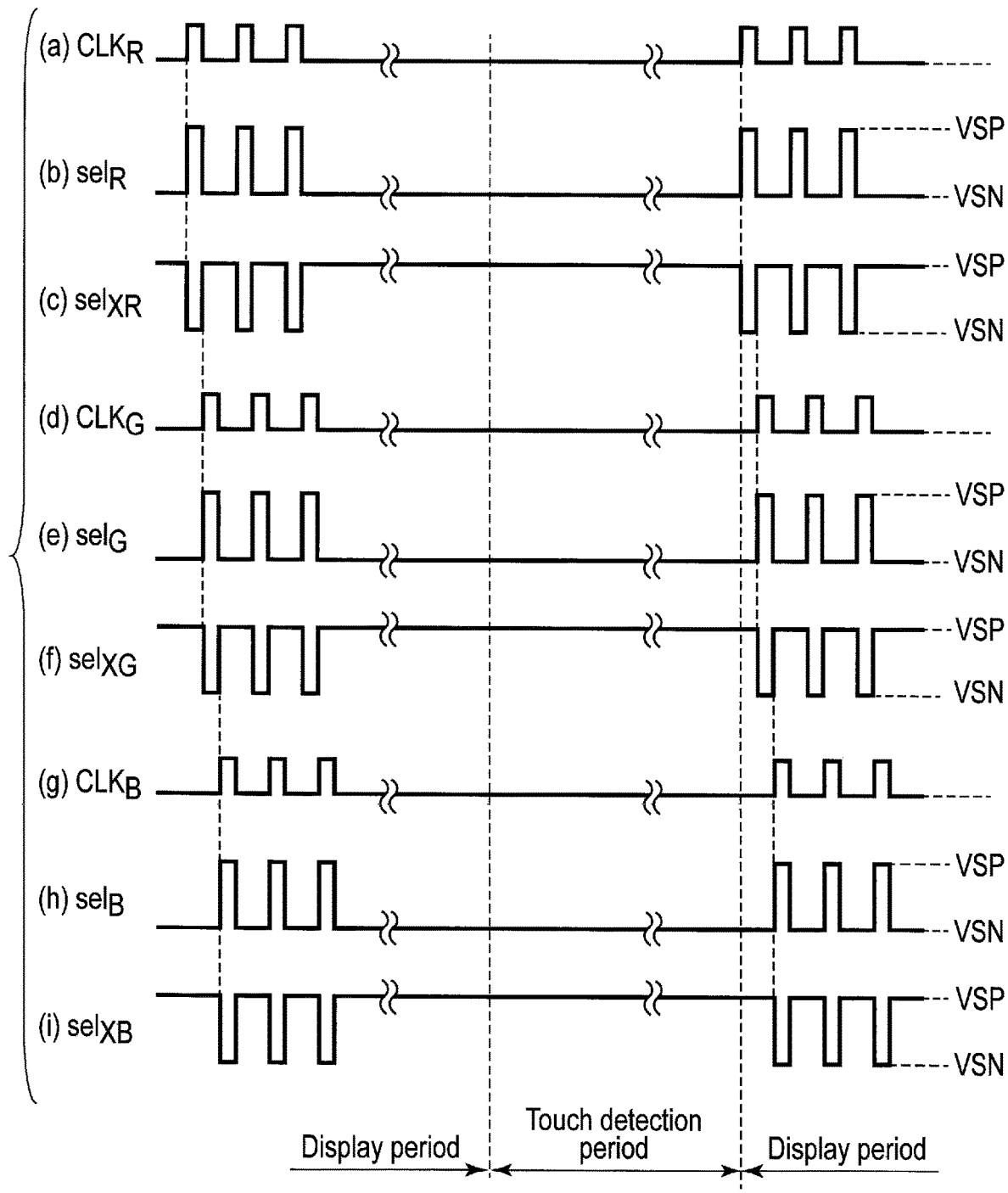
FIG. 16 shows an exemplary timing chart illustrating a selection operation of the select switch.

FIG. 16 is a timing chart indicative of the select control signals sel$_R$, sel$_G$, and sel$_B$ generated by the panel control signal generator 124 of FIG. 15. As illustrated at waveforms (a), (d), and (g) in FIG. 16, clocks CLK$_R$, CLK$_G$, and CLK$_B$ are pulse signals having the same cycle and shifted by one pulse period. The clocks CLK$_R$, CLK$_G$, and CLK$_B$ are generated during a display period, and are not generated during a touch detection period. The CMOS switches 190$_R$, 190$_G$, and 190$_B$ respectively output negative voltages VSN when the clocks CLK$_R$, CLK$_G$, and CLK$_B$ are in a high level, and output positive voltages VSP when the clocks CLK$_R$, CLK$_G$, and CLK$_B$ are in a low level. The outputs of the CMOS switches 190$_R$, 190$_G$, and 190$_B$ are inverted by the respective inverters 191, so that the select control signals sel$_R$, sel$_G$, and sel$_B$ are signals which synchronize with the respective clocks CLK, as illustrated at waveforms (b), (e), and (h) in FIG. 16. The inverted select control signals sel$_{XR}$, sel$_{XG}$, and sel$_{XB}$ are illustrated at waveforms (c), (f), and (i) in FIG. 16. Thereby, the select switches 104 are turned on when the select control signals sel$_R$, sel$_G$, and sel$_B$ are in high levels.

Now, other embodiments will be explained. Each of the other embodiments is a partial modification of the first embodiment. It is possible to combine any numbers of the other embodiments together.

Second Embodiment

In the first embodiment, as illustrated in waveform (h) of FIG. 14, the gate line 46 in the pixel array 18 and the source line 44 are driven by the guard signal in synchronization with the drive signal Tx for touch detection during a touch detection period. The drive signal is supplied to the source line 44 when the SIG-COM switch 148 is turned on. In the first embodiment, as illustrated in waveform (i) of FIG. 14, the RGB select switches 104 are sequentially turned on to divide a pixel signal into sub pixel signals during a display period, and are turned off during a touch detection period. Therefore, parasitic capacitance may occur in the control signal lines of the RGB select switches 104 during a touch detection period. A second embodiment suppressing an influence of the parasitic capacitance in the control signal lines will be explained. Similarly to the first embodiment, the second embodiment may be also applicable to both a self sensing touch sensor and a mutual sensing touch sensor.

Figure 17:
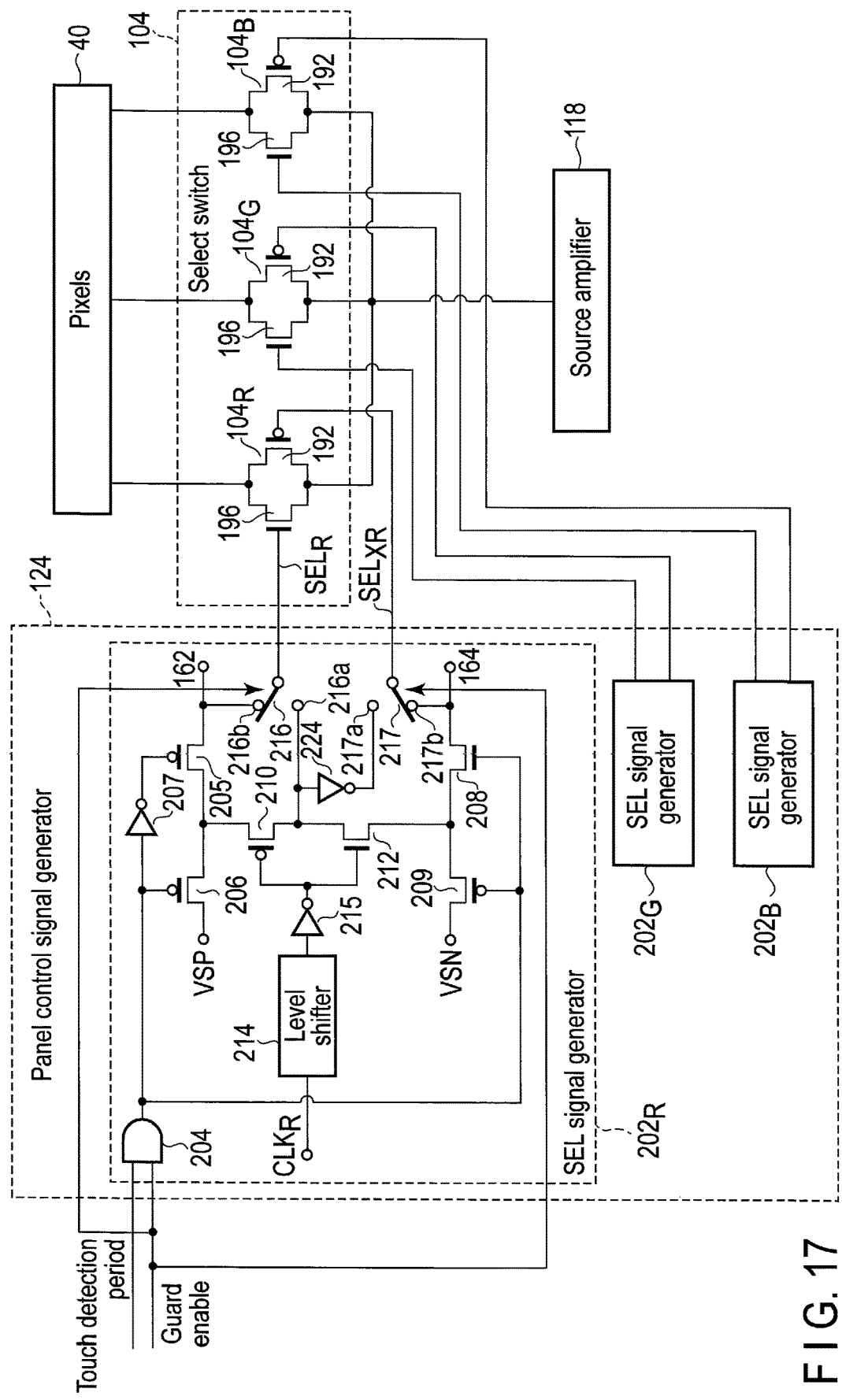
FIG. 17 is an exemplary circuit diagram illustrating a select control signal generator of a select switch in the panel control signal generator according to a second embodiment.

FIG. 17 is a circuit diagram illustrating a select control signal (SEL) generator 202$_R$ for the RGB select switch 104 in the panel control signal generator 124 according to the second embodiment. Other color select control signal generators 202$_G$ and 202$_B$ are similarly constructed. A touch detection period signal (high level during a touch detection period) and a guard enable signal are input to an AND gate 204.

PMOSFETs 205 and 206 are connected in series between the positive voltage terminal 162 and the external power source VSP. The PMOSFET 205 is connected to the positive voltage terminal 162, and the PMOSFET 206 is connected to the external power source VSP. An output of the AND gate 204 is connected to a gate of the PMOSFET 206. The output terminal of the AND gate 204 is also connected through an inverter 207 to a gate of the PMOSFET 205. The inverter 207 has a power source, which is connected to the ground and the positive voltage terminal 162, so that a voltage driving a next stage can be output.

An NMOSFET 208 and a PMOSFET 209 are connected in series between the negative voltage terminal 164 and the external power source VSN. The NMOSFET 208 is connected to the negative voltage terminal 164, and the PMOSFET 209 is connected to the external power source VSN. The output terminal of the AND gate 204 is connected to gates of the NMOSFET 208 and the PMOSFET 209.

A PMOSFET 210 and an NMOSFET 212 are connected in series between a connection point of the PMOSFETs 205 and 206, and a connection point of the NMOSFET 208 and the PMOSFET 209. The PMOSFET 210 is connected to the connection point of the PMOSFETs 205 and 206. The NMOSFET 212 is connected to the connection point of the NMOSFET 208 and the PMOSFET 209.

Clock CLK$_R$ is connected through a level shifter 214 and an inverter 215 to gates of the PMOSFET 210 and the NMOSFET 212. A connection point of the PMOSFET 210 and the NMOSFET 212 is connected to a first terminal 216$a$ of the selector 216. A second terminal 216$b$ of the selector 216 is connected to the positive voltage terminal 162. The selector 216 is controlled by the guard enable signal, and selects the first terminal 216$a$ during a disable period and the second terminal 216$b$ during an enable period. The select control signal SEL$_R$ is output from the selector 216 to the gate of the NMOSFET 196 in the switch 104$_R$. The inverter 215 has a power source connected to both the connection point of the PMOSFETs 205 and 206 and the connection point of the NMOSFET 208 and the PMOSFET 209 so that a voltage driving the next stage can be output.

The connection point of the PMOSFET 210 and the NMOSFET 212 is connected through an inverter 224 to a first terminal 217$a$ of a selector 217. The selector 217 has a second terminal 217$b$ connected to the negative voltage terminal 164. The selector 217 is also controlled by the guard enable signal, and selects the first terminal 217$a$ during a disable period and the second terminal 217$b$ during an enable period. The inverted select control signal SELXR is output from the selector 217 to the gate of the PMOSFET 192 in the switch 104$_R$. The inverter 224 has a power source connected to the ground and the external input power VSP so that a voltage driving the next stage can be output. It should be noted that level shifters may be connected to the gates of the PMOSFETs 205, 206, the NMOSFET 208, and the PMOSFET 209.

Figure 18:
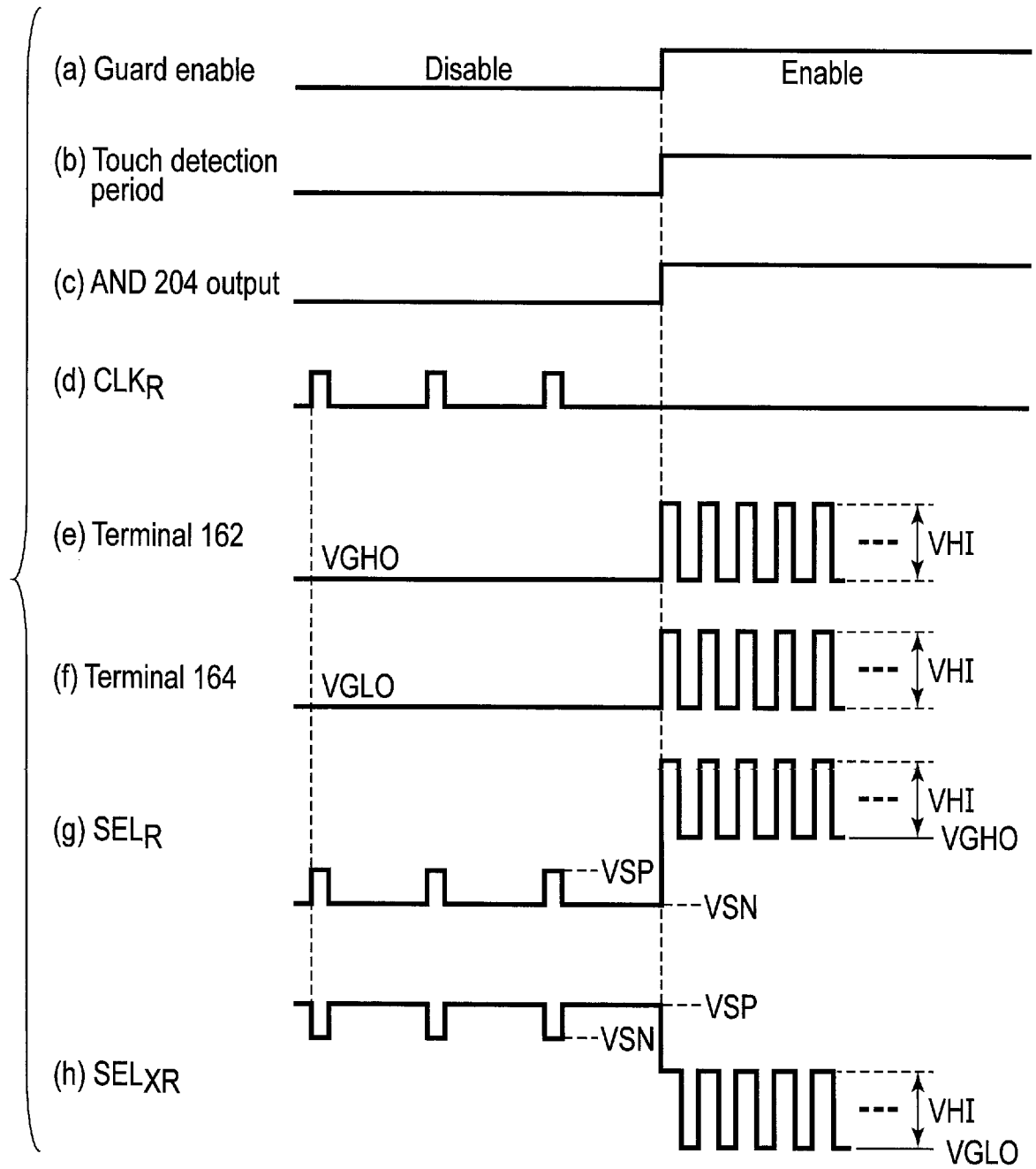
FIG. 18 shows an exemplary timing chart illustrating a guard drive for a select signal line of the select switch according to the second embodiment.

FIG. 18 is a timing chart illustrating the select control signals SEL$_R$ and SEL$_{XR}$ generated by the select control signal generator 202$_R$ of FIG. 17. Waveforms (a) and (b) in FIG. 18 respectively illustrate the guard enable signal and the touch detection period signal. The guard enable signal is in a high level during an enable period, and the touch detection period signal is in a high level during a touch detection period. Similarly to the timing chart of FIG. 14, the guard enable signal is disabled (in a low level) during a display period, and is enabled (in a high level) during a touch detection period. The touch detection period signal is in a low level during a display period and is in a high level during a touch detection period. Therefore, as illustrated in waveform (c) of FIG. 18, an output of the AND gate 204 is in a low level during a display period, and is in a high level during a touch detection period. The clock CLK$_R$ illustrated in waveform (d) of FIG. 18 is the same clock as the waveform (a) in FIG. 16. The clock CLK$_R$ is generated during a display period, but is not generated during a touch detection period.

During a display period, the output of the AND gate 204 is in a low level and the PMOSFETs 206 and 209 are turned on. The selectors 216 and 217 respectively select the first terminals 216$a$ and 217$a$. The PMOSFET 210 and the NMOSFET 212 are turned on according to whether the clock CLK$_R$ is in a high level or in a low level. Therefore, the select control signal SEL$_R$ is in a VSP level or in a VSN level during a display period according to whether the clock CLK$_R$ is in a high level or in a low level, as illustrated in waveform (g) of FIG. 18. The inverted select control signal SEL$_{XR}$ is in a low level or in a high level during a display period according to whether the clock CLK$_R$ is in a high level or in a low level, as illustrated in waveform (h) of FIG. 18.

During a touch detection period, the output of the AND gate 204 is in a high level and the PMOSFET 205 and the NMOSFET 208 are turned on. The selectors 216 and 217 select the second terminals 216*b* and 217*b*. Therefore, as illustrated in waveform (g) of FIG. 18, the select control signal $SEL_R$ becomes a signal which is the same as a signal output from the terminal 162 during a touch detection period. The inverted select control signal $SEL_{XR}$ becomes a signal which is the same as a signal output from the terminal 164 during a touch detection period, as illustrated in waveform (h) of FIG. 18. Accordingly, the select control signal $SEL_R$ is a pulse signal in which the guard signal is superposed on the positive output voltage VGHO, and the inverted select control signal $SEL_{XR}$ is a pulse signal in which the guard signal is superposed on the negative output voltage VGLO.

As described above, in the second embodiment, the select control signal of the RGB select switch 104 is subjected to amplitude modulation during a touch detection period according to the guard signal which synchronizes with the drive signal Tx. Accordingly, parasitic capacitance between the select signal line and the source line or between the inverted select signal line and the source line is hardly generated in the wiring area outside the pixel array 18.

Furthermore, in the second embodiment, the select control signal fluctuates in level between VSP (for example, +5.5V) and VSN (for example, −5.5V) during a display period. However, the low level of the select control signal is kept at VGHO, which is higher than VSP, during a touch detection period. On the other hand, similarly to the first embodiment, the SIG-COM switch 148 is turned on during a touch detection period, the drive signal Tx from the common electrode driver 126 returns from the common electrode 22 through the source line 44 to the RGB select switch 104. If the select control signal fluctuates in level between VSP and VSN during a touch detection period similarly to the display period, noises etc., may mix in the select control signal. If noises etc., will mix in the select control signal, the RGB select switch 104 will turn on. Then, a drive signal is input through the RGB select switch 104 into the source amplifier 118. Therefore, there is a possibility that the source amplifier 118 may be destroyed. However, the select control signal and the inverted select control signal illustrated in waveforms (g) and (h) of FIG. 18 are generated in the second embodiment. These signals cause the RGB select switch 104 to be turned off during a touch detection period.

The second embodiment may be applicable to a mutual sensing touch sensor. In such a case, drive signals should be supplied to the common electrodes one after another as illustrated in FIG. 5. Accordingly, what is subjected to a guard drive is only a select control signal supplied to an RGB select switch 104 corresponding to a source line which corresponds to a selected one of the common electrodes to which the drive signal is supplied. In order to achieve it, a SEL signal generator may be provided to each of the select switches 104 that are connected to the respective source lines.

Third Embodiment

A third embodiment will be explained relating to a modification of the select control signal generator of the second embodiment. FIG. 19 is a circuit diagram of the select control (SEL) signal generator $222_R$ of the third embodiment. The select control signal generators 222G and 222B for the other colors are similarly constructed. In the first embodiment or the second embodiment, it is possible to provide the select control signal generator in the display control circuit 16 or on the first substrate 12 similarly to the gate driver 102 or the RGB select switches 104. However, in the third embodiment, the generator 222 is provided on the first substrate 12. Similarly to the first and the second embodiment, the third embodiment may also be applicable to both a self sensing touch sensor and a mutual sensing touch sensor.

PMOSFETs 221 and 220 are connected in series between the positive voltage terminal 162 and a terminal to which the select control signal $sel_R$ of FIG. 15 is supplied. The PMOSFET 221 is connected to the select control signal $sel_R$ terminal, and the PMOSFET 220 is connected to the positive voltage terminal 162.

An NMOSFET 223 and a PMOSFET 222 are connected in series between the negative voltage terminal 164 and a terminal to which the inverted select control signal $sel_{XR}$ of FIG. 15 is supplied.

The touch detection period signal and the guard enable signal are input to an AND gate 218. An output of the AND gate 218 is connected to a gate of the PMOSFET 221. The output of the AND gate 218 is also connected through an inverter 232 to gates of the PMOSFETs 220 and 222 and the NMOSFET 223.

The select control signal $SEL_R$ is output from a connection point of the PMOSFETs 221 and 220 to a gate of an NMOSFET 196 in the switch $104_R$. An inverted select control signal $SEL_{XR}$ is output from a connection point of the NMOSFET 223 and the PMOSFET 222 to a gate of the PMOSFET 192 in the switch $104_R$.

FIG. 20 is a timing chart illustrating the select control signals $SEL_R$ and $SEL_{XR}$ generated by the select control signal generator $222_R$ of FIG. 19. Similarly to waveforms (a) and (b) in FIG. 18, waveforms (a) and (b) in FIG. 20 respectively indicate the guard enable signal and the touch detection period signal. An output of the AND gate 218 is high in level during a touch detection period, as illustrated in waveform (c) of FIG. 20.

The output of the AND gate 218 is low in level during a display period, so that the PMOSFET 221 and the NMOSFET 223 are turned on. As a result, as illustrated in waveform (h) of FIG. 20, the select control signal $SEL_R$ is the same as the select control signal $sel_R$ (waveform (f) of FIG. 20) during a display period. As illustrated in waveform (i) of FIG. 20, the inverted select control signal $SEL_{XR}$ is the same as the inverted select control signal $sel_R$ (waveform (g) of FIG. 20) during a display period.

The output of the AND gate 218 is high in level during a touch detection period, so that the PMOSFETs 220 and 222 are turned on. As a result, as illustrated in waveform (h) of FIG. 20, the select control signal $SEL_R$ is the same as the signal of the terminal 162 (waveform (d) of FIG. 20) during a touch detection period. As illustrated in waveform (i) of FIG. 20, the inverted select control signal $SEL_{XR}$ is the same as the signal of the terminal 164 (waveform (e) of FIG. 20).

Therefore, the generator 222 of FIG. 19 can generate similarly to FIG. 18 the select control signal $SEL_R$, which is a pulse signal obtained by superposing the guard signal on the positive output voltage VGHO, and the inverted select control signal $SEL_{XR}$, which is a pulse signal obtained by superposing the guard signal on the negative output voltage VGLO. Therefore, the generator 222 of FIG. 19 can obtain the same effect as the second embodiment.

The third embodiment may be applicable to a mutual sensing touch sensor. In such a case, drive signals should be supplied to the common electrodes one after another as illustrated in FIG. 5. Accordingly, what is subjected to a guard drive is only a select control signal supplied to an RGB select switch 104 corresponding to a source line which corresponds to a selected one of the common electrodes to which the drive signal is supplied. In order to achieve it, a SEL signal generator may be provided to each of the select switches 104 that are connected to the respective source lines.

Fourth Embodiment

In the second and the third embodiment, what is subjected to a guard drive during a touch detection period is the select control signal of the RGB select switch 104. A fourth embodiment applied to a self sensing touch sensor is explained in which the input signals to the RGB select switches 104, i.e., the output signals of the source amplifier 118 are subjected to a guard drive during a touch detection period, and all the driving electrodes are simultaneously driven.

Since a liquid crystal will deteriorate if direct current voltage is continuously supplied, the voltage supplied to the source lines may sometimes be AC driven. The AC drive includes a dot reverse system, in which every frame is subjected to such a reverse driving that vertically and horizontally adjacent pixels are reversed in polarity, and a column reverse system, in which every frame is subjected to such a reverse driving that horizontally adjacent pixels are reversed in polarity without reversing vertically adjacent pixels. The fourth embodiment will be explained with taking a column reverse system as an example.

Figure 21A:
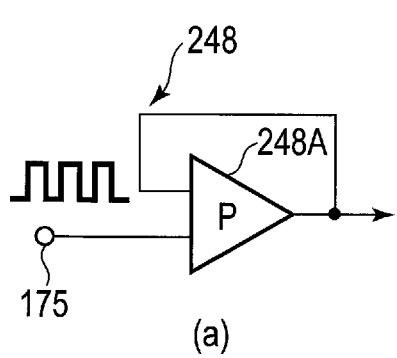
FIG. 21A is an exemplary view explaining the guard drive for an output of a source amplifier according to a fourth embodiment.
Figure 21B:
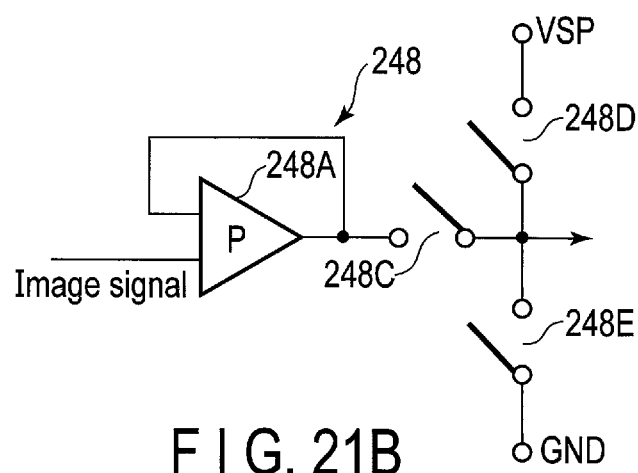
FIG. 21B is an exemplary view explaining the guard drive for the output of the source amplifier according to the fourth embodiment.
Figure 21C:
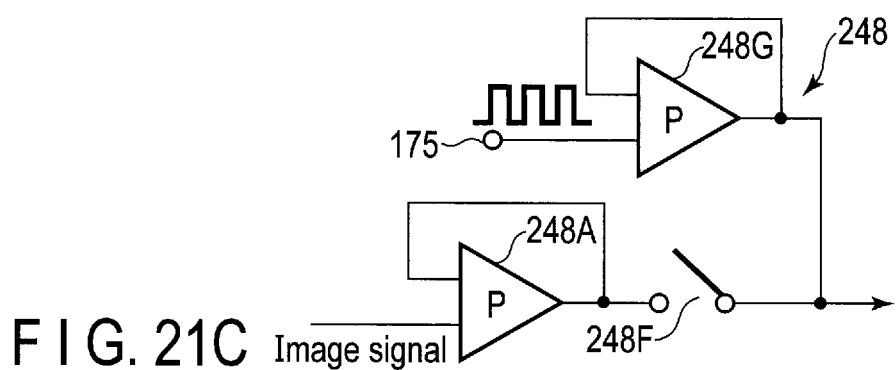
FIG. 21C is an exemplary view explaining the guard drive for the output of the source amplifier according to the fourth embodiment.
Figure 21D:
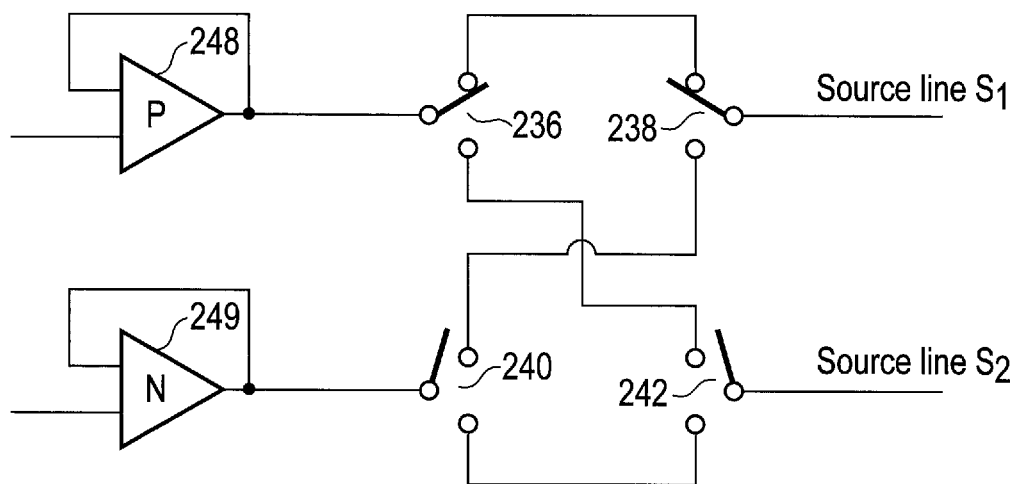
FIG. 21D is an exemplary view explaining the guard drive for the output of the source amplifier according to the fourth embodiment.

The source amplifier includes, as illustrated in FIG. 21D, a positive polarity amplifier 248 operated by a positive power source and a negative polarity amplifier 249 operated by a negative power source. For example, in a certain frame, an image signal for an odd-numbered source line is supplied to the positive polarity amplifier 248, and an image signal for an even numbered source line is supplied to the negative polarity amplifier 249. During a touch detection period, an output of the positive polarity amplifier 248 is subjected to a guard drive and an output of the negative polarity amplifier 249 is set to a high impedance state. An example for subjecting the output signal of the positive polarity amplifier 248 to a guard drive is illustrated in FIGS. 21A, 21B, and 21C.

The positive polarity amplifier 248 in FIG. 21A includes a positive polarity operational amplifier 248A having an input terminal connected to the terminal 175 (FIG. 13). The pulse signal, the basis of the drive signal Tx, is supplied to the positive polarity operational amplifier 248A during a touch detection period. The operational amplifier 248A is operated by the external power sources VSP and VSN. An image signal is input to the operational amplifier 248A during a display period. During a touch detection period, the operational amplifier 248A amplifies the pulse signal of the terminal 175 and outputs the guard signal (refer to waveform (b) of FIG. 14) which is a pulse having an amplitude of VHI.

In FIG. 21A, the operational amplifier 248A itself amplifies the pulse, which is the basis of the drive signal Tx, and generates the guard signal. However, it is possible to use an ordinary amplifier as the operational amplifier 248A. In such a case, the guard signal may be applied to the output terminal of the amplifier only during a touch detection period, thereby outputting the guard signal from the output terminal of the operational amplifier 248A. Some examples are illustrated in FIGS. 21B and 21C.

In the amplifier 248 of FIG. 21B, ON/OFF switches 248C, 248D, and 248E are connected to an output terminal of the operational amplifier 248A to which an image signal is supplied. The ON/OFF switches 248D and 248E are connected in series between the external power source VSP and the ground. The ON/OFF switch 248C is connected between the output terminal of the operational amplifier 248A and a connection point of the ON/OFF switches 248D and 248E. During a touch detection period, the switch 248C is turned off, and the switches 248D and 248E are alternately turned on and off in synchronism with the drive signal Tx. Thereby the output level of the operational amplifier 248A fluctuates between a ground level and the external power source VPN. Therefore, the guard signal as illustrated in waveform (b) of FIG. 14 is output from the operational amplifier 248A.

The amplifier 248 of FIG. 21C include an ON/OFF switch 248F connected to the output terminal of the operational amplifier 248A and a positive polarity operational amplifier 248G. An input of the operational amplifier 248G is connected to the terminal 175. The pulse signal which is similar to the guard signal is output by turning off the switch 248F during a touch detection period. This structure also makes it possible to cause the output terminal of the operational amplifier 248A to output the guard signal as illustrated in waveform (b) of FIG. 14.

For example, an output of the positive polarity amplifier 248 constituted as illustrated in FIGS. 21A, 21B, and 21C is connected to first terminals of selectors 238 and 242 through a selector 236. A first terminal of the selector 236 is connected to the first terminal of the selector 238. A second terminal of the selector 236 is connected to the first terminal of the selector 242. An output of a negative polarity amplifier 249 is connected to second terminals of the selectors 238 and 242 through a selector 240. A first terminal of the selector 236 is connected to the second terminal of the selector 238. A second terminal of the selector 240 is connected to the second terminal of the selector 242.

An output of the selector 238 is supplied to an odd-numbered source line S1, and an output of the selector 242 is supplied to an even-numbered source line S2. The source lines S1 and S2 are respectively connected to the RGB select switches 104-1 and 104-2. Outputs of the positive polarity amplifier the negative polarity amplifier are similarly supplied to other source lines.

The selectors 236, 238, 240, and 242 are switched for every frame. The selectors 236, 238, 240, and 242 are selected such that the output of the positive polarity amplifier 248 is supplied to the source line S1 and the output of the negative polarity amplifier 249 is supplied to the source line S2 at a certain frame, for example, at every odd frame, and the output of the positive polarity amplifier 248 is supplied to the source line S2 and the output of the negative polarity amplifier 249 is supplied to the source line S1 at every even frame.

Figure 22:
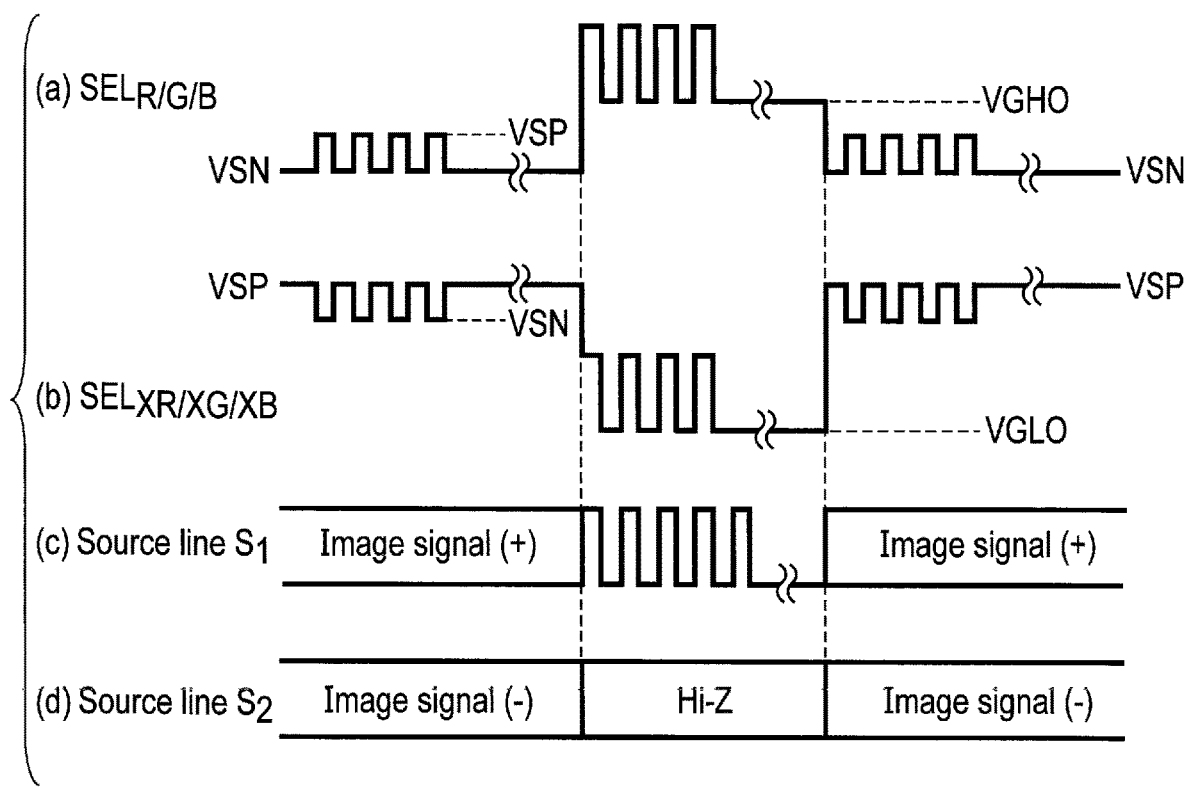
FIG. 22 shows an exemplary timing chart illustrating the guard drive for the output of the source amplifier according to the fourth embodiment.

Waveforms (a) and (b) of FIG. 22 respectively illustrate the selection control signal $SEL_{R/G/B}$ and the inverted selection control signal $SEL_{XR/XG/XB}$, both for the RGB select switch 104 of a certain frame, for example, an odd frame. Waveforms (c) and (d) of FIG. 22 respectively illustrate a signal level exhibited by the source line S1 and a signal level exhibited by the source line S2.

In this way, the guard signal is output during a touch detection period from the source amplifier 118 (the positive polarity amplifier 248). Therefore, the parasitic capacitance is hardly generated between the common electrode 22 and a corresponding one of the output lines of the source amplifier 118 (signal lines between the source amplifier 118 and the RGB select switches 104).

Fifth Embodiment

In a fifth embodiment, the guard signal is output from the source amplifier 118 during a touch detection period similarly to the fourth embodiment. The fourth embodiment is applied to a simultaneously driven self sensing system, whereas the fifth embodiment is applied to a mutual sensing touch sensor. As described above, a mutual sensing touch sensor sequentially selects the common electrodes 22-1, 22-2, . . . during a touch detection period, and sequentially supplies the driving signals Tx1, Tx2, . . . to the selected common electrodes.

Figure 23:
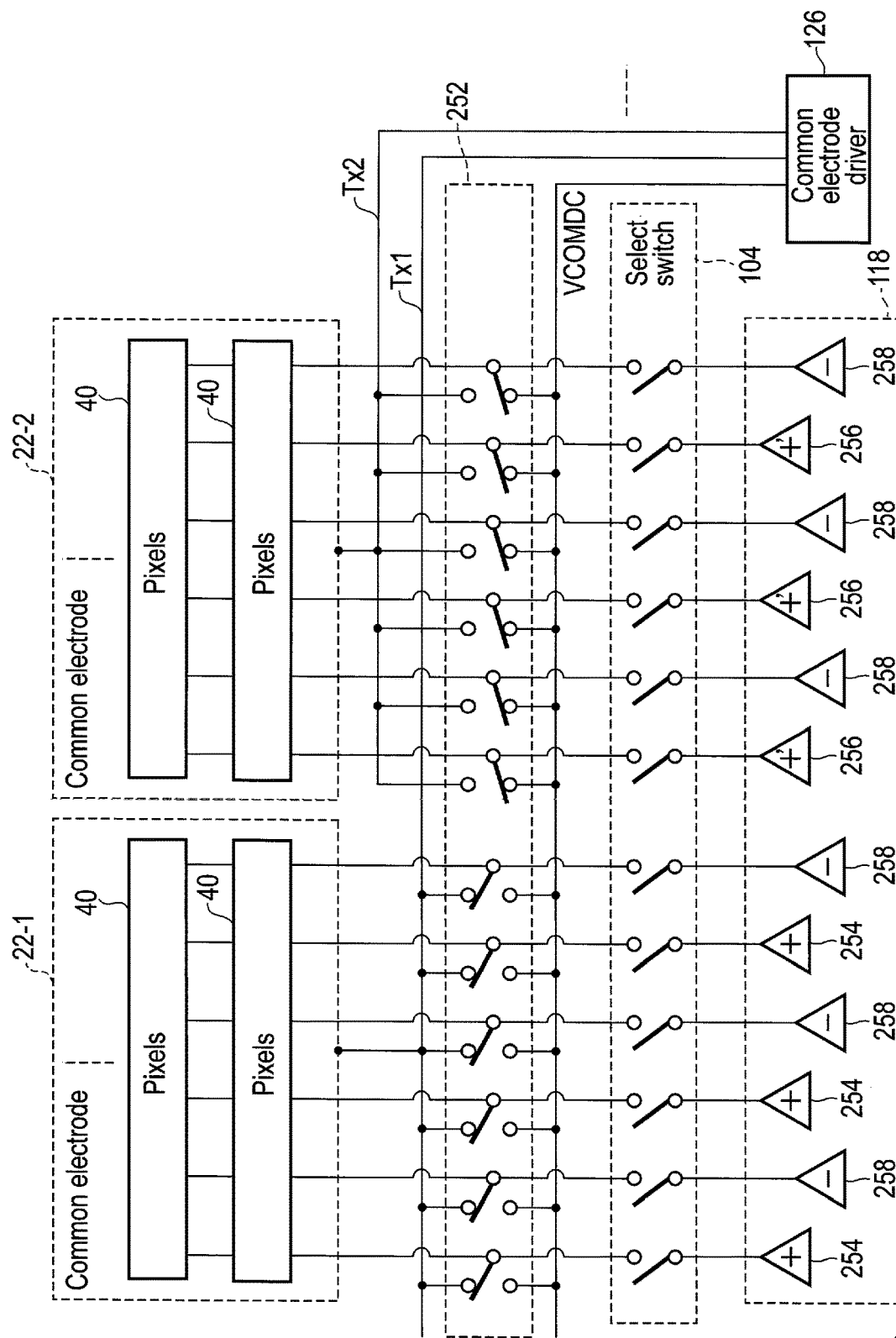
FIG. 23 is an exemplary view explaining the guard drive for the output of the source amplifier according to a fifth embodiment.

In the fourth embodiment concerning a simultaneously driven self sensing touch sensor, the positive polarity amplifier 248 of the source amplifier 118 outputs the guard signal sufficient for all the pixels in one line during a touch detection period. In the mutual sensing touch sensor of the fifth embodiment, as illustrated in FIG. 23, common electrodes are selected one by one. The guard signals are output from only those positive polarity amplifiers in the source amplifier 118 that correspond to a selected one of the common electrodes. The guard signals are not output from the remaining positive polarity amplifiers in the source amplifier 118 that do not correspond to the selected one of the common electrodes. First positive polarity amplifiers that output the guard signal during a touch detection period are named positive polarity amplifiers (+) 254, and second positive polarity amplifiers that do not output any guard signal during a touch detection period are named positive polarity amplifiers (+') 256.

The output of each of the positive polarity amplifiers (+') 256 is in a high impedance state during a touch detection period. The positive polarity amplifier 248 illustrated in FIGS. 21A, 21B, and 21C may be used for the first positive polarity amplifiers (+) 254 and the second positive polarity amplifiers (+') 256. The positive polarity amplifier 248 may be used as either the first positive polarity amplifier or the second positive polarity amplifier by controlling outputting of the guard signal from the positive polarity amplifier 248 during a touch detection period. A negative polarity amplifier (−) 258 is the same as the negative polarity amplifier 249 illustrated in FIG. 21D, outputs a negative polarity pixel signal during a display period, and outputs a high impedance signal during a touch detection period.

The common electrode driver 126 outputs a constant voltage VCOMDC for display during a display period, and outputs drive signals Tx1, Tx2, . . . to the respective common electrodes 22-1, 22-2, . . . during a touch detection period.

A voltage select switch 252 for connecting either the voltage VCOMDC or the drive signal Tx to the source line during a touch detection period is connected between the RGB select switch 104 and the common electrode 22. The panel control signal generator 124 switches the voltage select switch 252 such that a source line corresponding to the selected common electrode is connected to the drive signal Tx1, and that source lines corresponding to non-selected common electrodes are connected to the voltage VCOMDC.

Accordingly, the guard signal from the source amplifier 118 (the positive polarity amplifier 254) is added to the drive signal Tx output from the common electrode driver 126 to the common electrode 22 during a touch detection period. Therefore, in comparison with a case where the common electrode 22 is driven only by the drive signal Tx, the drive signal Tx in a display panel is improved in slew rate, and touch detection is improved in accuracy.

The fifth embodiment may be applicable to a self sensing touch sensor so long as the touch sensor is sequentially driven.

Sixth Embodiment

According to the fifth embodiment, the guard signal output from the source amplifier 118 is added to the drive signal Tx output from the common electrode driver 126 to the common electrode 22 during a touch detection period. The fifth embodiment may also be applicable to a mutual sensing touch sensor having an ordinary two-chip structure (comprising a display controller IC and a touch controller IC).

In the ordinary display device having a two-chip structure, the common electrode driver 126B does not output the drive signals Tx1, Tx2, . . . to the respective common electrodes 22-1, 22-2, but outputs a single drive signal TSVCOM to all the common electrodes. The drive signal TSVCOM is supplied as the drive signal Tx only to a selected common electrode selected by the TSVCOM select switch 264. The TSVCOM select switch 264 includes switches assigned to the respective common electrodes 22-1, 22-2, . . . . The common electrode driver 126B also outputs a constant voltage VCOMDC. The constant voltage VCOMDC is supplied to non-selected common electrodes through a VCOMDC select switch 262. The VCOMDC select switch 262 includes switches assigned to the respective common electrodes 22-1, 22-2, . . . .

In such an ordinary two-chip structured touch sensor, a drive signal supply source is only a TSVCOM terminal. If a load of the drive signal Tx is large, a settling characteristic may be deteriorated.

Figure 24:
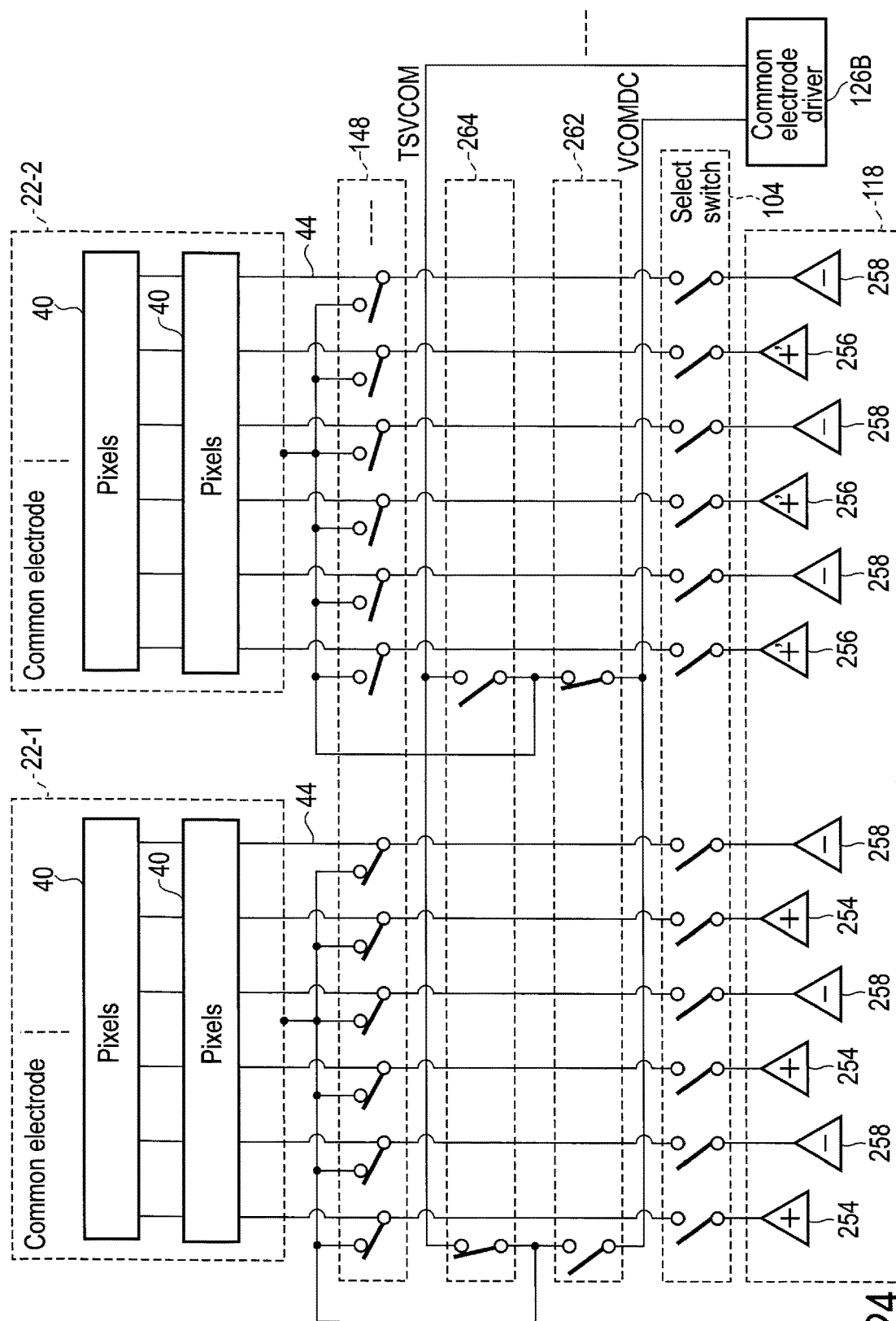
FIG. 24 is an exemplary view explaining the guard drive for the output of the source amplifier according to a sixth embodiment.

However, as illustrated in FIG. 24, an output of the source amplifier 118 is supplied through the RGB select switch 104 to the pixel 40 and also supplied through the SIG-COM switch 148 to selected common electrode 22. The SIG-COM switch 148 short-circuits the common electrode 22 and the source line 44 during a touch detection period.

A constant direct current voltage VCOMDC output from the common electrode driver 126B is supplied through the VCOM select switch 262 to non-selected common electrodes 22. T drive signal TSVCOM output from the common electrode driver 126B is supplied through the TSVCOM select switch 264 to the selected common electrode 22. The VCOM select switch 262 and the TSVCOM select switch 264 are connected in series between the voltage VCOMDC line and the voltage TSVCOM line. A connection point of the VCOM select switch 262 and the TSVCOM select switch 264 is connected to the common electrode 22. During a display period, the switch 262 is turned on and the switch 264 is turned off. Therefore, the direct current voltage VCOMDC is supplied to the common electrode 22 during a display period. States of the switches 262 and 264 corresponding to a non-selected common electrode 22-2, for example, during a touch detection period are the same as states of the switches 262 and 264 during a display period. The switches 262 and 264 corresponding to a selected common electrode, for example, 22-1, are turned off and on during a touch detection period. Therefore, the drive signal TSVCOM is supplied to the common electrodes 22 during a touch detection period.

The source amplifier 118 is constructed as FIG. 23. Accordingly, the source amplifier 118 corresponding to the selected common electrode 22-1 includes the first positive polarity amplifiers (+) 254 and the negative polarity amplifiers (−) 258. The source amplifier 118 corresponding to the non-selected common electrode 22-2 includes the second positive polarity amplifiers (+') 256 and the negative polarity amplifiers (−) 258.

The common electrode driver 126B and the source amplifier 118 are provided in the display controller (display controller IC) 16, and the RGB select switch 104, the VCOM select switch 262, the TSVCOM select switch 264, and the SIG-COM switch 148 are provided in a display panel.

FIG. 25 is a timing chart indicative of a driving of the selected common electrode. Waveform (a) of FIG. 25 illustrates the drive signal Tx supplied to the selected driving electrode. Waveform (b) of FIG. 25 illustrates an operation of the source amplifier 118. Waveform (c) of FIG. 25 illustrates the select control signal $SEL_{R/G/B}$ supplied to the select switch 104. During a display period, the drive signal Tx is in a low level, the select control signal $SEL_{R/G/B}$ sequentially selects RGB, and the source amplifier 118 outputs an image signal. During a touch detection period, the drive signal Tx is a pulse signal of a high level and a low level, and the select control signal $SEL_{R/G/B}$ is a pulse signal in which the guard signal synchronized with the drive signal is superposed on a VGHO level.

Similarly to the fifth embodiment, the first positive polarity amplifiers 254 in the source amplifier 118 corresponding to a selected common electrode outputs the pulse signal according to the guard signal during a touch detection period. In order to output a pulse signal, the positive polarity amplifier 254 requires power (a power source) when a signal level is changed from a low level to a high level or from a high level to a low level. The positive polarity amplifier 254 does not require power while the pulse is maintained at a high level or a low level, and thus is set to a high impedance state. Therefore, as illustrated in waveform (b) of FIG. 25, during a touch detection period, the first positive polarity amplifier 254 in the source amplifier 118 corresponding to the selected common electrode 22 is driven by a positive voltage VSP when the pulse is risen. Subsequently, the first positive polarity amplifier 254 is set to a high impedance state and then driven by a ground level when the pulse is fallen. A high impedance state may be achieved by turning off the power source of the positive polarity amplifier 254 or, alternatively, by turning off a switch which is connected to the output of the positive polarity amplifier 254.

In the sixth embodiment, similarly to the fifth embodiment, the guard signal output from the source amplifier 118 (the positive polarity amplifier 254) is added to the drive signal Tx supplied to a selected common electrode during a touch detection period. Therefore, the drive signal Tx in a display panel is improved in slew rate, and the touch detection is improved in accuracy. Furthermore, in the sixth embodiment, the positive polarity amplifier 254 is not kept driven during a touch detection period, but is brought into a high impedance state when the pulse is maintained at a high level or a low level. Therefore, even if a drive signal supply source is a TSVCOM terminal alone, settling characteristic will not be deteriorated. In addition, electric power consumption is reduced.

Seventh Embodiment

Figure 26:
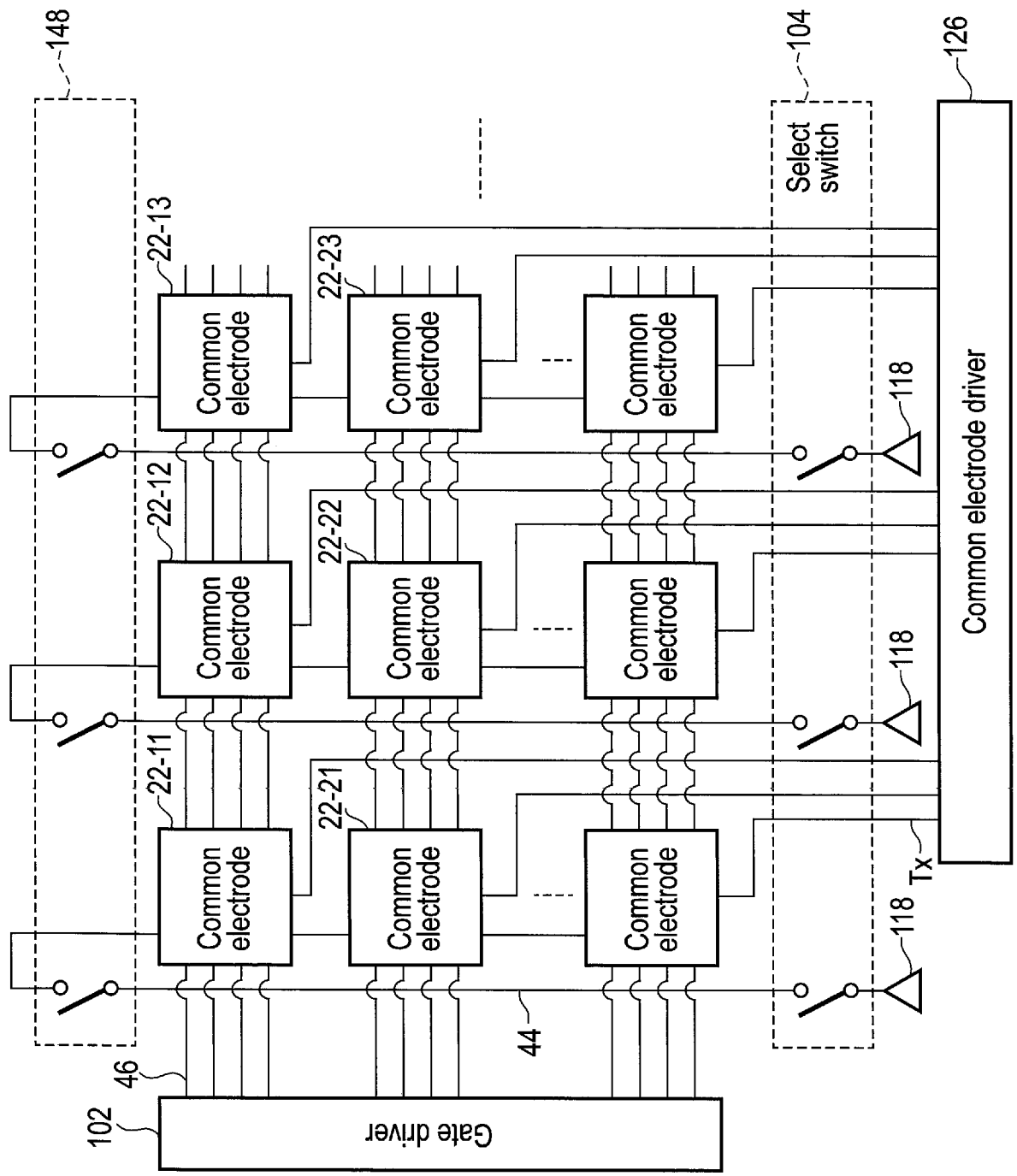
FIG. 26 is an exemplary view explaining the guard drive according to a seventh embodiment.

FIG. 26 is a block diagram indicative of a seventh embodiment concerning a self sensing type touch panel.

The first to the fifth embodiments are also applicable to a self sensing system. In the first to the fifth embodiments, common electrodes having a long and narrow shape along a pixel column direction (Y axis) are arranged along a pixel row direction (X axis), as illustrated in FIG. 4. The seventh embodiment concerns a shape modification made to every common electrode in a self sensing system touch panel.

In the touch panel illustrated in FIG. 26, the common electrodes 22 are arranged in the shape of a two dimensional array. The output signal from each of the common electrodes 22 is used as a coordinate of a touch position. One common electrode may be provided for every pixel or for every some pixels. If one common electrode is provided for every some pixels, it may be provided for every some pixels arranged in a two dimensional array. Any shape may be applicable to a common electrode as long as the common electrode can cover corresponding pixels. Furthermore, the common electrodes do not need to align vertically or horizontally. The common electrode driver 126, the source amplifier 118, and the panel control signal generator 124 are driven during a touch detection period similarly to the above mentioned embodiments. The self sensing touch panel, as illustrated in FIG. 26, also makes it possible to prevent any parasitic capacitance generated between a common electrode and a wiring from affecting any drive signals supplied to the respective common electrodes for touch detection.

Eighth Embodiment

A modification commonly applicable to all the embodiments mentioned above will be explained as an eighth embodiment. FIG. 27 illustrates a portion of the panel control signal generator 124 relating to a guard drive of a gate line according to the eighth embodiment. A voltage terminal 308 is added to the panel control signal generator 124 of the first embodiment illustrated in FIG. 13. The booster circuit 170 boosts up the positive external input power VSP (for example, +5.5V) twice. The boosted voltage VGH (for example, +11.0V) is supplied to both the LDO regulator 172 and a first terminal of a selector 312. The selector 312 has a second terminal in a high impedance state. The selector 312 selects the first terminal during a display period, and selects the second terminal during a touch detection period. An output of the selector 312 is connected to the voltage terminal 308.

In short, the eighth embodiment may be obtained by adding to the flexible printed circuit board 28 illustrated in FIG. 13 a coupling capacitor 316 connected between the voltage terminal 308 and the guard terminal 166.

Figure 28:
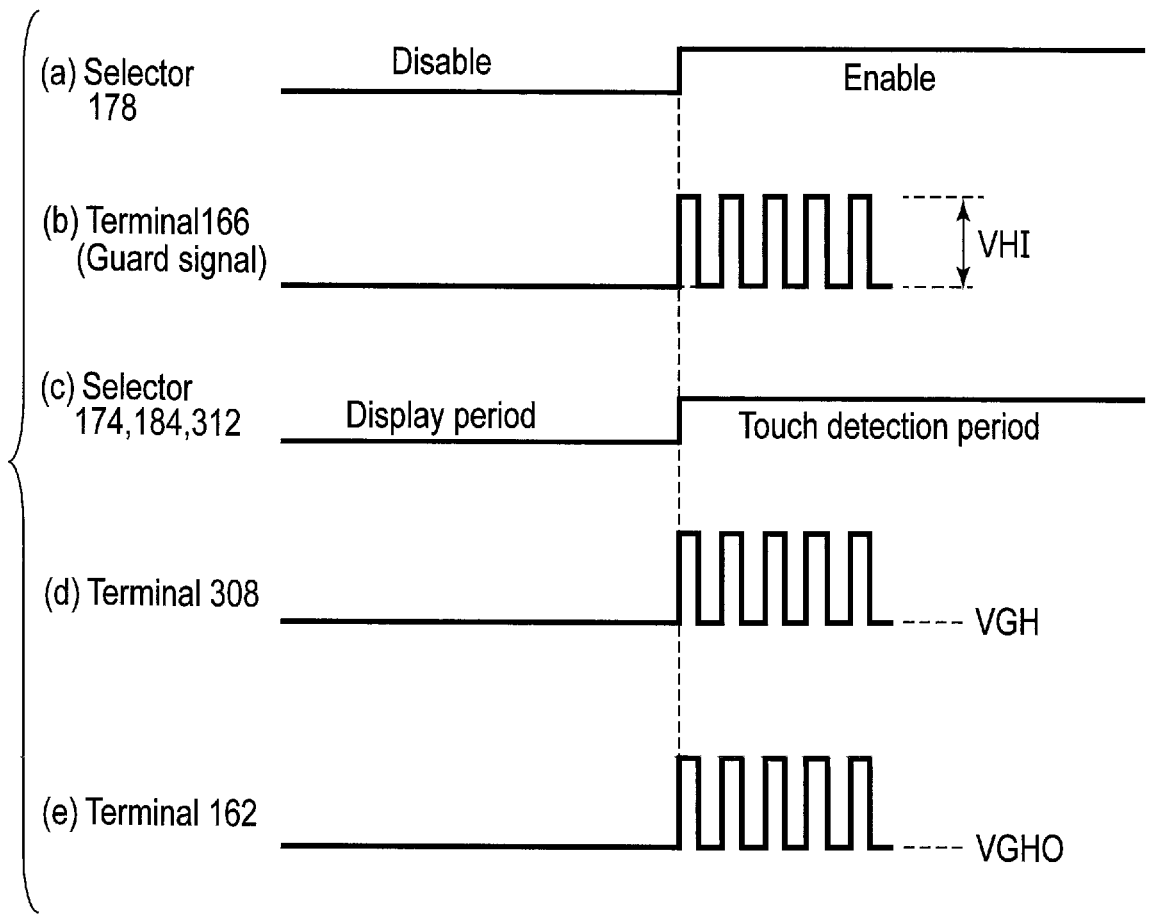
FIG. 28 is an exemplary diagram indicative of a signal waveform of a power source line according to the eighth embodiment.

The guard drive of the gate line by the panel control signal generator 124 of FIG. 27 will be explained with reference to the timing chart of FIG. 28. In FIG. 28, waveform (a) illustrates a state of the selector 178 (the state is the same as waveform (a) of FIG. 14), waveform (b) illustrates a state of the guard terminal 166 (the state is the same as waveform (b) of FIG. 14), waveform (c) illustrates a state of each of the selectors 174, 184, and 312 (the state is the same as the state of each of the selectors 174 and 184 in waveform (c) of FIG. 14), and waveform (e) illustrates a state of the positive voltage terminal 162 (the state is the same as waveform (d) of FIG. 14). The selector 312 selects the first terminal during a display period, so that the terminal 308 outputs a voltage of VGH as illustrated in waveform (d) of FIG. 28. The selector 174 selects the first terminal during a display period, so that the terminal 162 outputs a voltage of VGHO as illustrated in waveform (e) of FIG. 28. The selector 178 is connected to the disabling side during a display period, so that the terminal 166 is grounded. Therefore, the coupling capacitor 316 is charged with the voltage VGH during a display period.

When the display period is changed to a touch detection period, the selector 178 will switch to the enabling side. The guard terminal 166 outputs a pulsed guard signal, as illustrated in waveform (b) of FIG. 28. The guard signal has amplitude of VHI. When the display period is changed to the touch detection period, the selector 312 will switch to the second terminal (high impedance). The guard signal output from the guard terminal 166 is supplied to the voltage terminal 308 through the coupling capacitor 316. The capacitance of the coupling capacitor 316 is determined such that the current leakage from the coupling capacitor 316 can be disregarded and the charges of the coupling capacitor 316 may be kept during a touch detection period. Therefore, as illustrated in waveform (d) of FIG. 28, the voltage terminal 308 outputs a voltage in which the guard signal is superposed on the voltage VGH. Although not illustrated, the terminal 308 is also connected to the pixel array 18, and the power VGH is used as various kinds of electric power. Therefore, when the gate line 46, the source line 44, the control signal line of the RGB select switch 104, etc., are subjected to the guard drive, the influence of parasitic capacitance may also appear in the pixel array 18 connected to the terminal 308 and the internal wirings of the touch panel 20. However, during a touch detection period, the voltage of the terminal 308 becomes a voltage in which the guard signal is superposed on VGH (a guard drive is performed). It is considered that the voltage VGH is also subjected to the guard drive. Accordingly, the influence of parasitic capacitance will not be exerted on the internal wirings.

Similarly to the first embodiment, when a display period is switched to a touch detection period, the selector 162 is switched to the second terminal (high impedance). The guard signal output from the guard terminal 166 is applied through the coupling capacitor 144 to the positive voltage terminal 162. The voltage of the positive voltage terminal 162 is a signal in which the guard signal is superposed on VGHO, as illustrated in waveform (e) of FIG. 28.

When the guard signal is superposed on the positive voltage terminal 162 in the structure of FIG. 13 which does not have the coupling capacitor 316, the positive voltage terminal 162 may have to be higher than the high voltage VGH depending on guard signal amplitude or VGH/VGHO setting voltage. The difference between the voltage VGH and voltage VGHO needs to be greater than the guard signal amplitude VHI. However, guard signal amplitude is small in a self sensing system. A problem may not occur even in the structure of FIG. 13.

In the eighth embodiment, the guard signal is superposed on the voltage of the terminal 308 by the coupling capacitor 316. The voltage VGHO and the voltage VGH is subjected to the guard drive. The difference between the voltage VGH and the voltage VGHO is greater than the guard signal amplitude VHI. The gate line is stably subjected to the guard drive.

Overview of Embodiments

The embodiments include the following configurations.

(1) A display device includes:

a pixel array 18 including a plurality of pixels 40 arranged in rows and columns;

common electrodes 22 over the pixel array 18 for capacitance type touch detection;

a common electrode driver 126 configured to supply a direct current voltage for display to the common electrodes 22 during a display period and a drive signal Tx for touch detection to the common electrodes 22 during a touch detection period;

source lines 44 connected to the columns of the pixels 40 in the pixel array 18;

a source amplifier 118 configured to supply an image signal to the source lines 44;

gate lines 46 connected to the rows of the pixels 40 in the pixel array 18;

a gate driver 102 configured to successively supply a scanning signal to the respective gate lines 46 during a display period, and supply a guard signal in the same phase as the drive signal to the gate lines 46 during a touch detection period; and switches 148 connected between the source lines 44 and the common electrodes 22 and configured to connect the source lines 44 and the common electrodes 22 during a touch detection period.

According to this display device, the source lines 44 and the common electrodes 22 are connected to each other by the switches 148 during a touch detection period. The drive signal Tx flowing through the common electrodes 22 also flow through the source lines 44. Therefore, parasitic capacitance will never occur between the source lines 44 and the common electrodes 22. Moreover, the drive signals Tx flowing through the common electrodes 22 also flow through the gate lines 46 during a touch detection period. Therefore, parasitic capacitance will never occur between the gate lines 46 and the common electrodes 22. Accuracy of touch detection is prevented from being deteriorated by parasitic capacitance and the common electrodes are driven by a desired waveform with the use of the drive signals Tx.

(2) In the display device of (1), the common electrodes 22 include a vertical COM type common electrode, and are parallel to signal lines 44.

(3) In the display device of (1), the common electrodes 22 include a horizontal COM type common electrode, and cross signal lines 44.

(4) The display device of (1) has detecting electrodes 24 intersecting the common electrodes 22. The drive signal Tx is supplied to the common electrodes 22, and touch detection is performed by a mutual sensing system based on the detected potential detected by the detecting electrodes 24.

(5) In the display device of (1), the drive signal is supplied to the common electrodes 22, and touch detection is performed by a self sensing system based on change of the capacity of the common electrodes 22.

(6) In the display device of (1), touch detection periods are within one frame period, and a touch detection period is between a display period and a next display period. Constant direct current voltage is supplied to the common electrodes during a display period. The driving pulse is sequentially supplied to the common electrodes for touch detection operation.

While certain embodiments have been described, these embodiments have been presented by way of example only, and are not intended to limit the scope of the inventions. Indeed, the novel embodiments described herein may be brought into practice in a variety of other forms; furthermore, various omissions, substitutions and changes may be made in the embodiments described herein without departing from the spirit of the inventions. The accompanying claims and their equivalents are intended to cover such forms or modifications as would fall within the scope and spirit of the inventions.

What is claimed is:

1. A display device comprising:
a pixel array comprising pixels two dimensionally arranged in rows and columns;
common electrodes over the pixel array for capacitance type touch detection;
a common electrode driver configured to supply a voltage for display to the common electrodes during a display period and a drive signal for touch detection to the common electrodes during a touch detection period, wherein the drive signal includes at least one pulse;

source lines connected to the columns of the pixels in the pixel array;

a source amplifier configured to supply an image signal to the source lines;

gate lines connected to the rows of the pixels in the pixel array;

a gate driver configured to sequentially supply a scanning signal to the gate lines during the display period, and continuously supply a first signal to the gate lines during the touch detection period, wherein the first signal includes at least one pulse, and a phase of the at least one pulse of the first signal is same as a phase of the at least one pulse of the drive signal;

first switches connected between the source lines and the common electrodes and configured to connect the source lines and the common electrodes each other during the touch detection period;

a select switch including second switches, each of the second switches being connected between the source amplifier and the source lines and configured to divide the image signal into the sub pixel signals; and a controller electrically connected to the select switch, wherein the controller is configured to supply a first control signal to sequentially turn on the second switches to the select switch during the display period, and wherein the controller is configured to supply a second control signal to the select switch during the touch detection period, and the second control signal includes at least one pulse and a phase of the at least one pulse of the second control signal is same as a phase of the at least one pulse of the drive signal.

2. The display device of claim 1, wherein each of the pixels comprises sub pixels of different colors; and the image signal comprises a time division multiplex signal comprising sub pixel signals of the different colors.

3. The display device of claim 1, wherein the common electrode driver is configured to simultaneously supply the drive signal to the common electrodes during the touch detection period in order to execute self sensing touch detection based on capacitance of the common electrodes.

4. The display drive of claim 1, wherein the source amplifier is configured to supply a second signal to the select switch during the touch detection period, and wherein a phase of the second signal is same as a phase of the drive signal.

5. The display device of claim 4, wherein the common electrode driver is configured to simultaneously supply the drive signal to the common electrodes during the touch detection period in order to execute self sensing touch detection based on capacitance of the common electrodes.

6. The display device of claim 1, wherein an amplitude of the at least one pulse of the first signal is same as an amplitude of the at least one pulse of the drive signal.

7. The display device of claim 1, wherein an amplitude of the at least one pulse of the second control signal is same as an amplitude of the at least one pulse of the drive signal.

8. A display device comprising:

a pixel array including pixels two dimensionally arranged in rows and columns;

common electrodes over the pixel array for capacitance type touch detection;

a common electrode driver configured to supply a voltage for display to the common electrodes during a display period and a drive signal for touch detection to the common electrodes during a touch detection period, wherein the drive signal includes at least one pulse;

source lines connected to the columns of the pixels in the pixel array;

a source amplifier configured to supply an image signal to the source lines;

gate lines connected to the rows of the pixels in the pixel array;

a gate driver configured to successively supply a scanning signal to the gate lines during the display period, and continuously supply a first signal to the gate lines during the touch detection period, wherein the first signal includes at least one pulse, and a phase of the at least one pulse of the first signal is same as a phase of the at least one pulse of the drive signal;

first switches connected between the source lines and the common electrodes and configured to connect the source lines and the common electrodes each other during the touch detection period;

a select switch including second switches, each of the second switches being connected between the source amplifier and the source lines and configured to divide the image signal into the sub pixel signals; and a controller electrically connected to the select switch, wherein the controller is configured to supply a first control signal to sequentially turn on the second switches to the select switch during the display period, and wherein the controller is configured to supply a second control signal to the select switch during the touch detection period, and the second control signal includes at least one pulse and a phase of the at least one pulse of the second control signal is same as a phase of the at least one pulse of the drive signal.

9. A method of driving a display device comprising:

a pixel array comprising pixels two dimensionally arranged in rows and columns;

common electrodes over the pixel array for capacitance type touch detection;

a common electrode driver connected to the common electrodes;

source lines connected to the columns of the pixels in the pixel array;

a source amplifier connected to the source lines;

gate lines connected to the rows of the pixels in the pixel array;

a gate driver connected to the gate lines; and first switches connected between the source lines and the common electrodes, the method comprising:

supplying, by the common electrode driver, a voltage for display to the common electrodes during a display period;

supplying, by the common electrode driver, a drive signal for touch detection to the common electrodes during a touch detection period, wherein the drive signal includes at least one pulse;

supplying, by the source amplifier, an image signal to the source lines;

sequentially supplying, by the gate driver, a scanning signal to the respective gate lines during the display period;

continuously supplying, by the gate driver, a first signal to the gate lines during the touch detection period, wherein the first signal includes at least one pulse, and a phase of the at least one pulse of the first signal is same as a phase of the at least one pulse of the drive signal;

connecting, by the first switches, the source lines and the common electrodes each other during the touch detection period;

dividing the image signal into the sub pixels by a select switch including second switches, each of the second switches being connected between the source amplifier and the source lines;

supplying, by a controller, a first control signal to sequentially turn on the second switches to the select switch during the display period; and supplying, by the controller, a second control signal to the select switch during the touch detection period, wherein the second control signal includes at least one pulse, and a phase of the at least one pulse of the second control signal is same as a phase of the at least one pulse of the drive signal.

10. The method of claim 9, wherein an amplitude of the at least one pulse of the first signal is same as an amplitude of the at least one pulse of the drive signal.

11. The method of claim 9, wherein an amplitude of the at least one pulse of the second control signal is same as an amplitude of the at least one pulse of the drive signal.

\* \* \* \* \*